July 7, 1931. F. J. TILLMAN 1,813,472
AUTOMATIC PHONOGRAPH
Filed Dec. 22, 1919   12 Sheets-Sheet 6
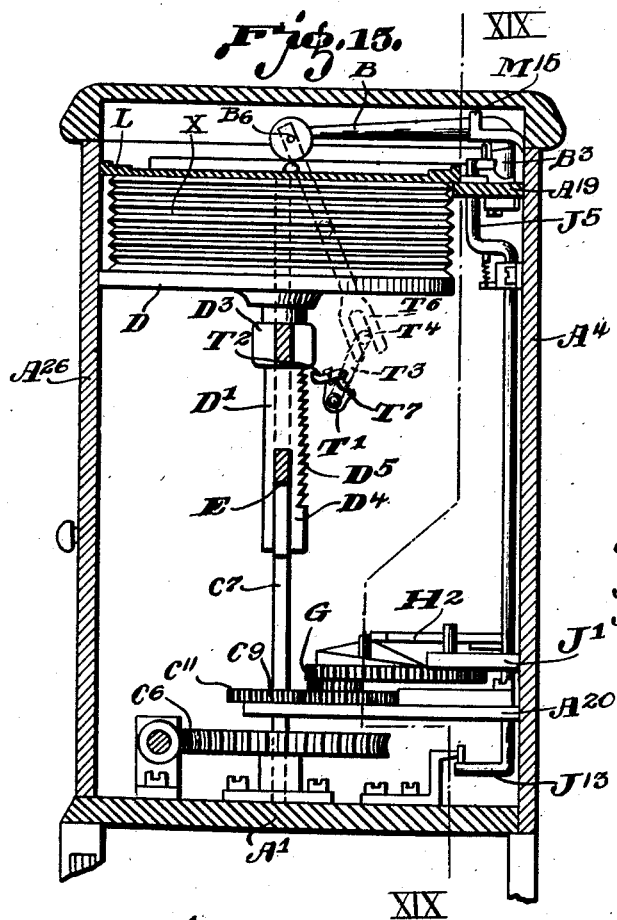
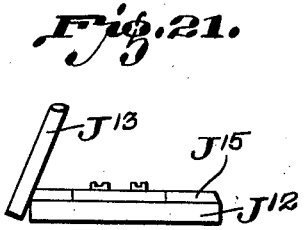
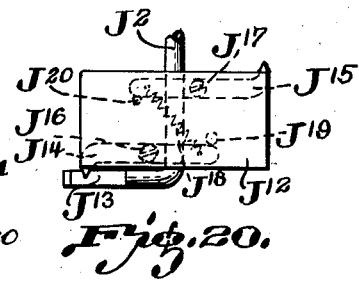
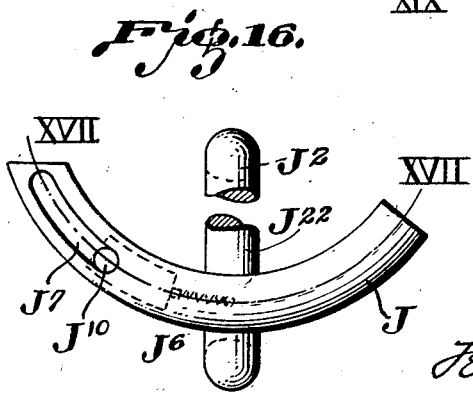
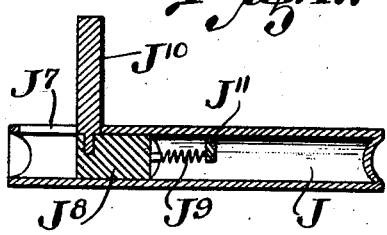
Inventor
Ferdinand J. Tillman July 7, 1931. F. J. TILLMAN 1,813,472
AUTOMATIC PHONOGRAPH
Filed Dec. 22, 1919 12 Sheets-Sheet 7
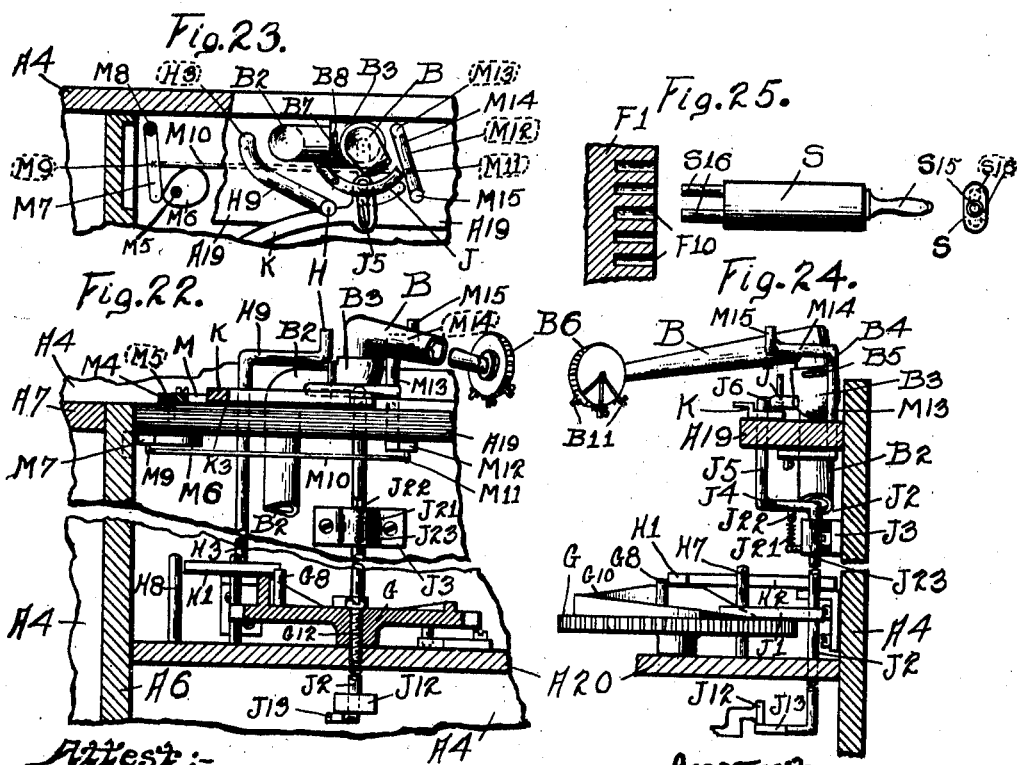

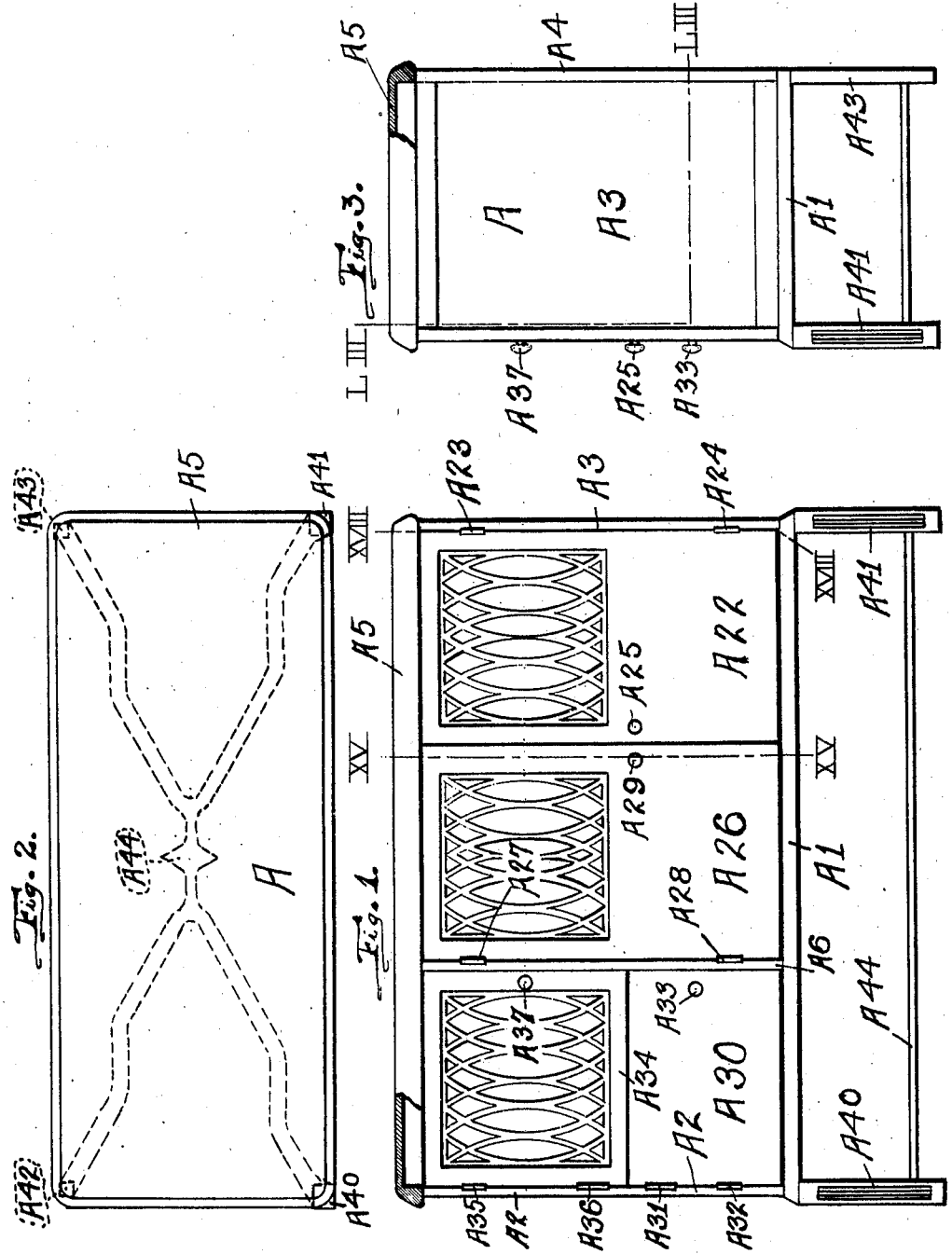

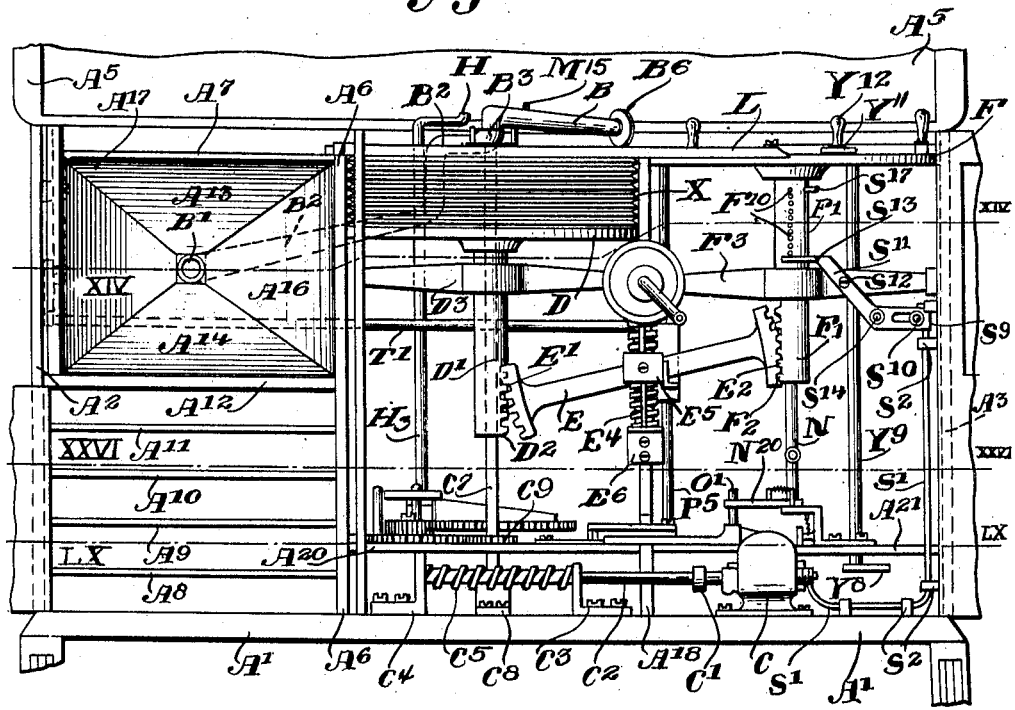
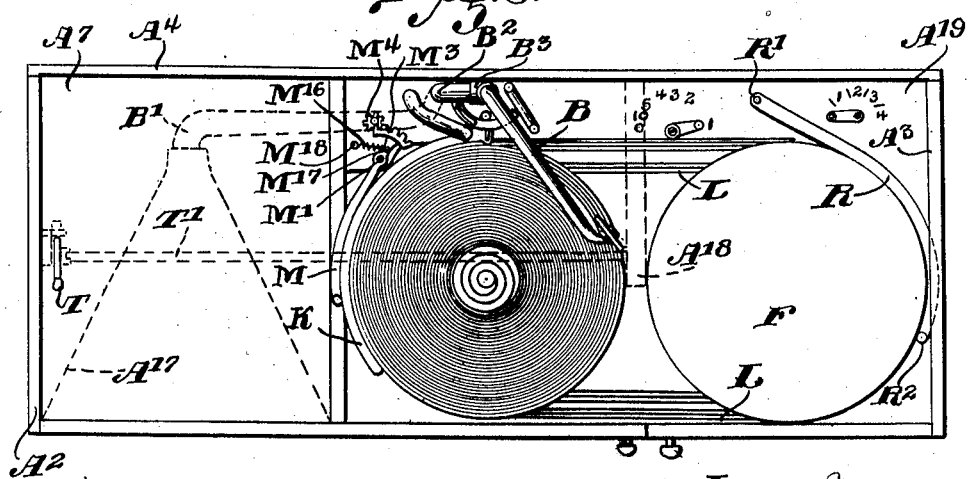

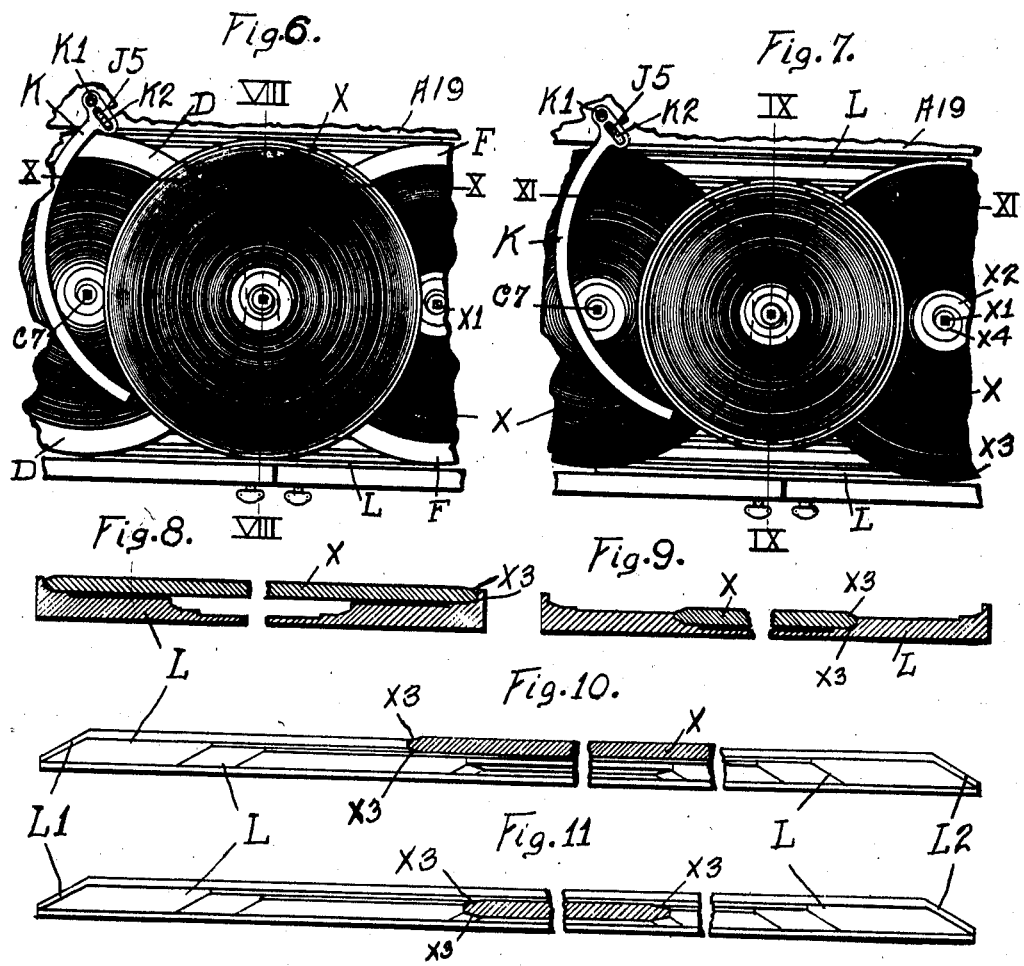

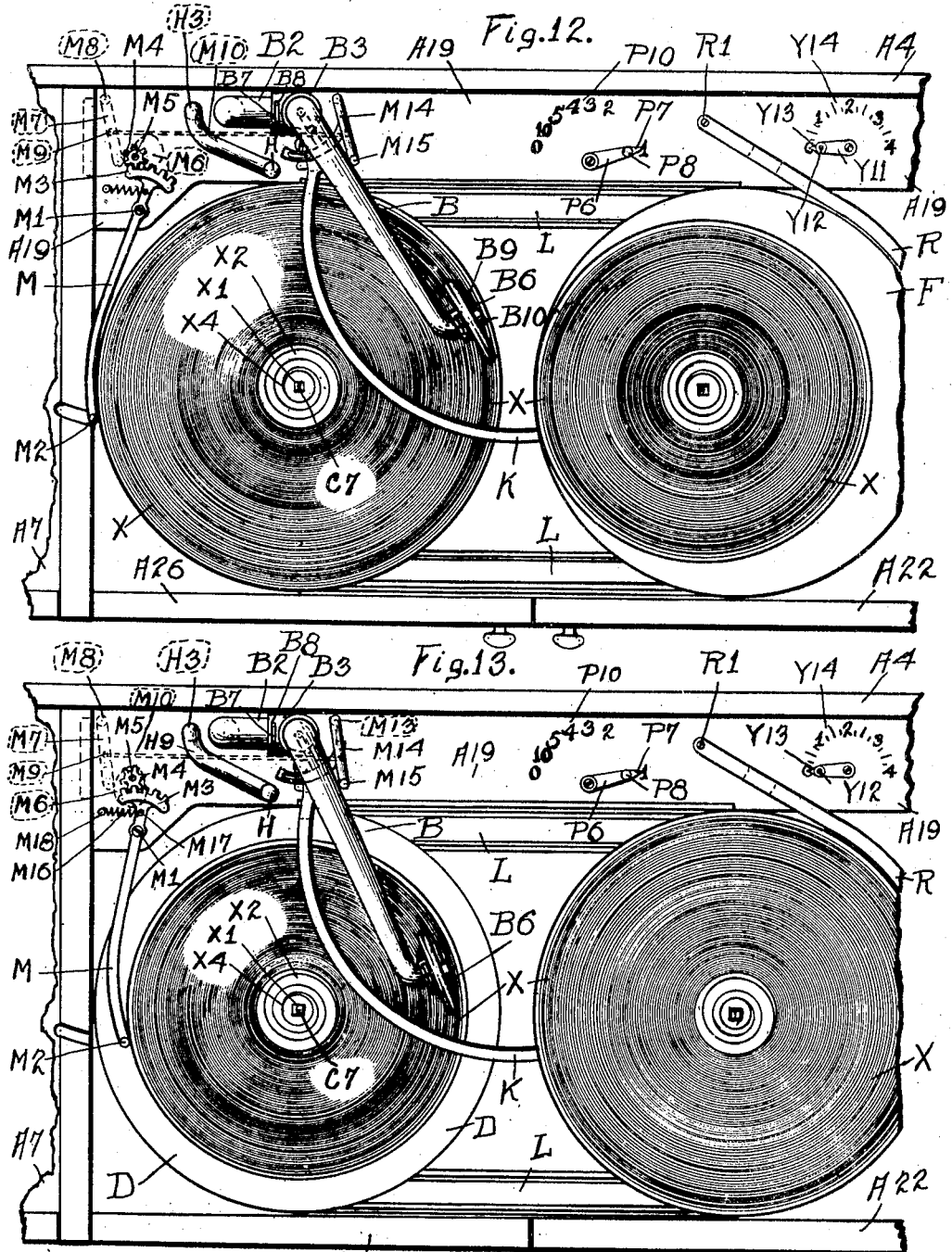

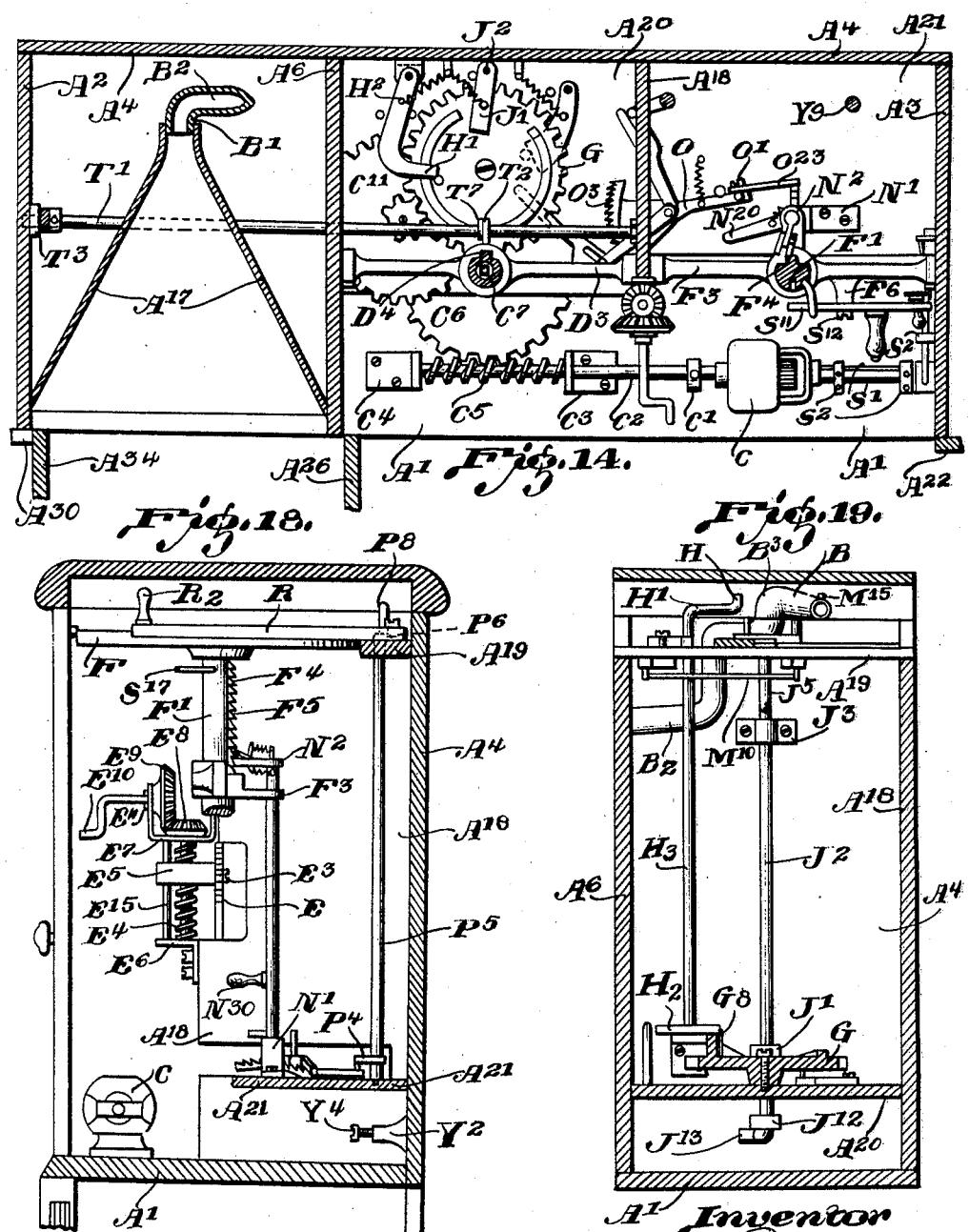

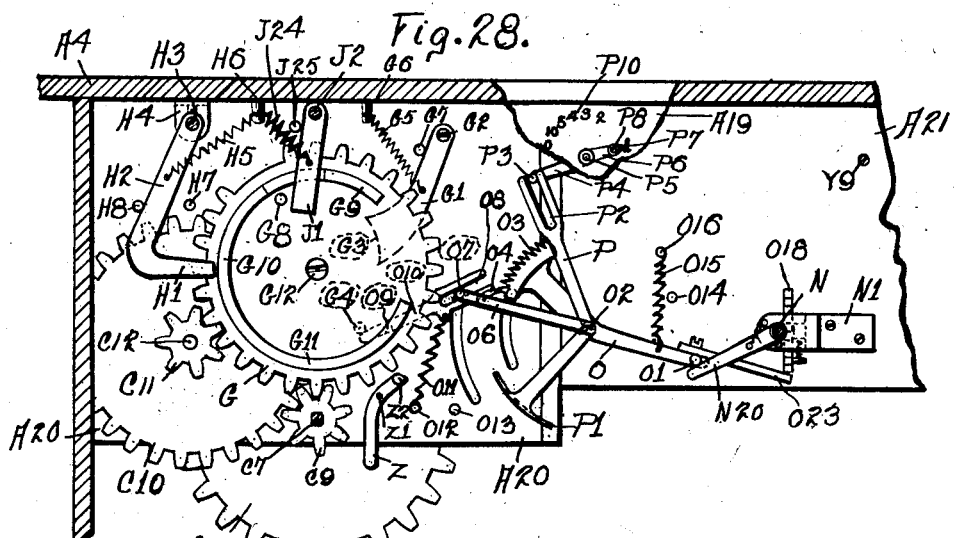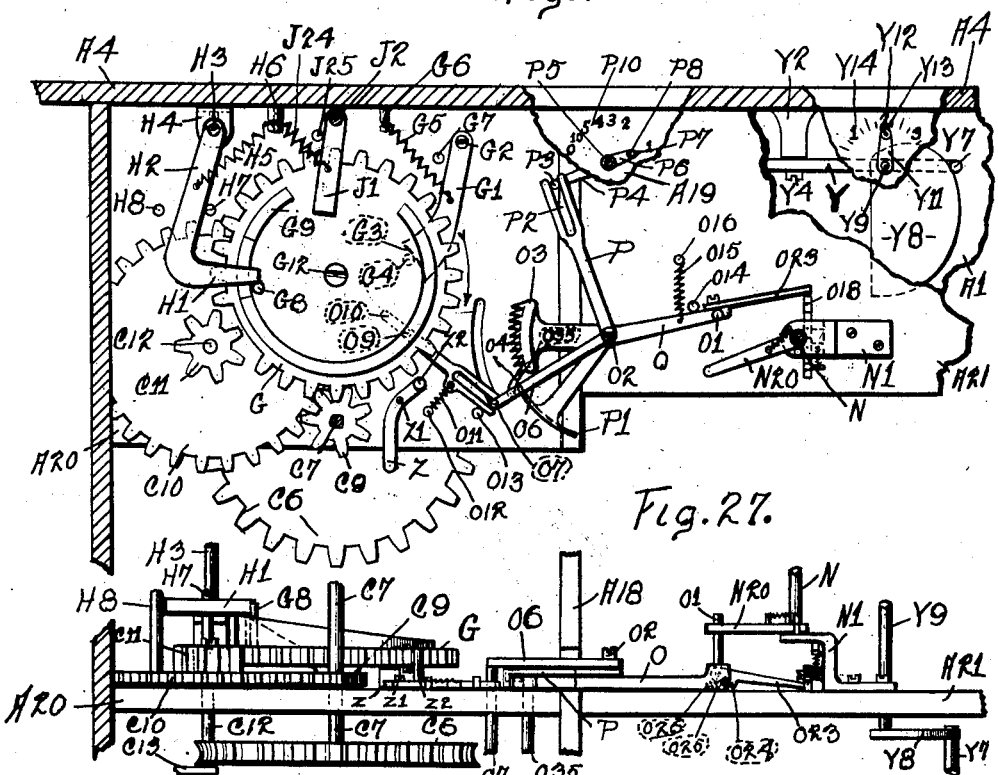

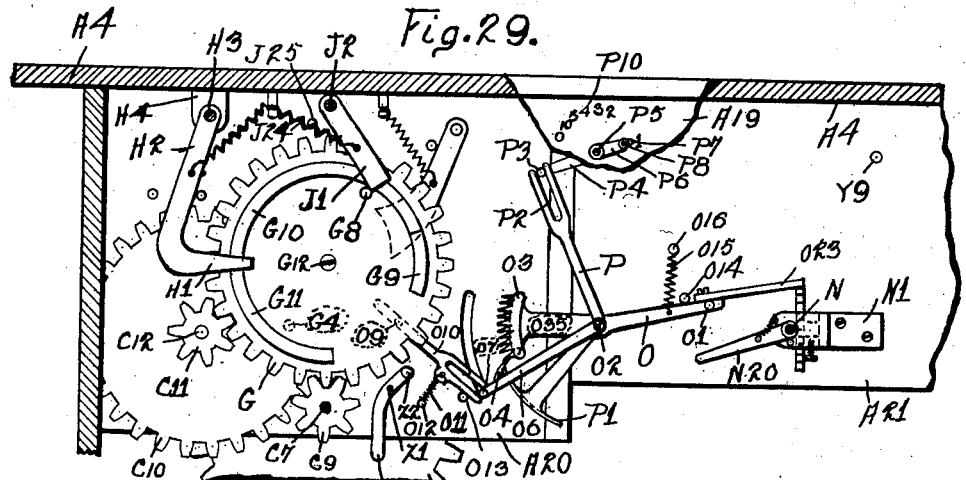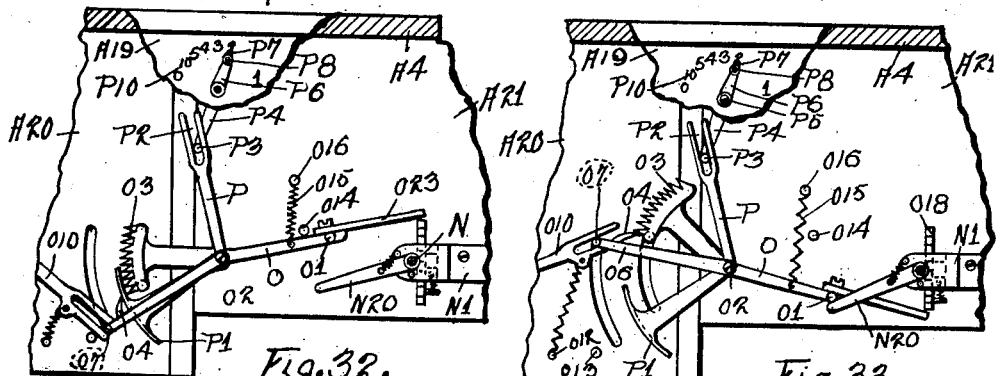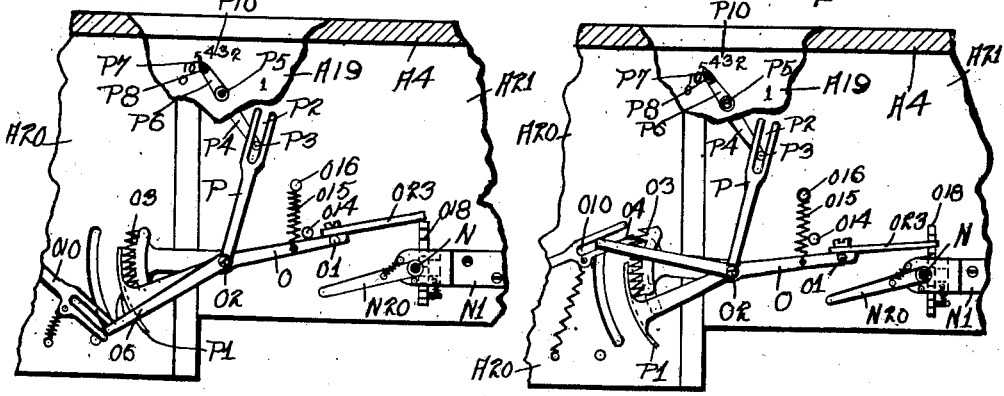

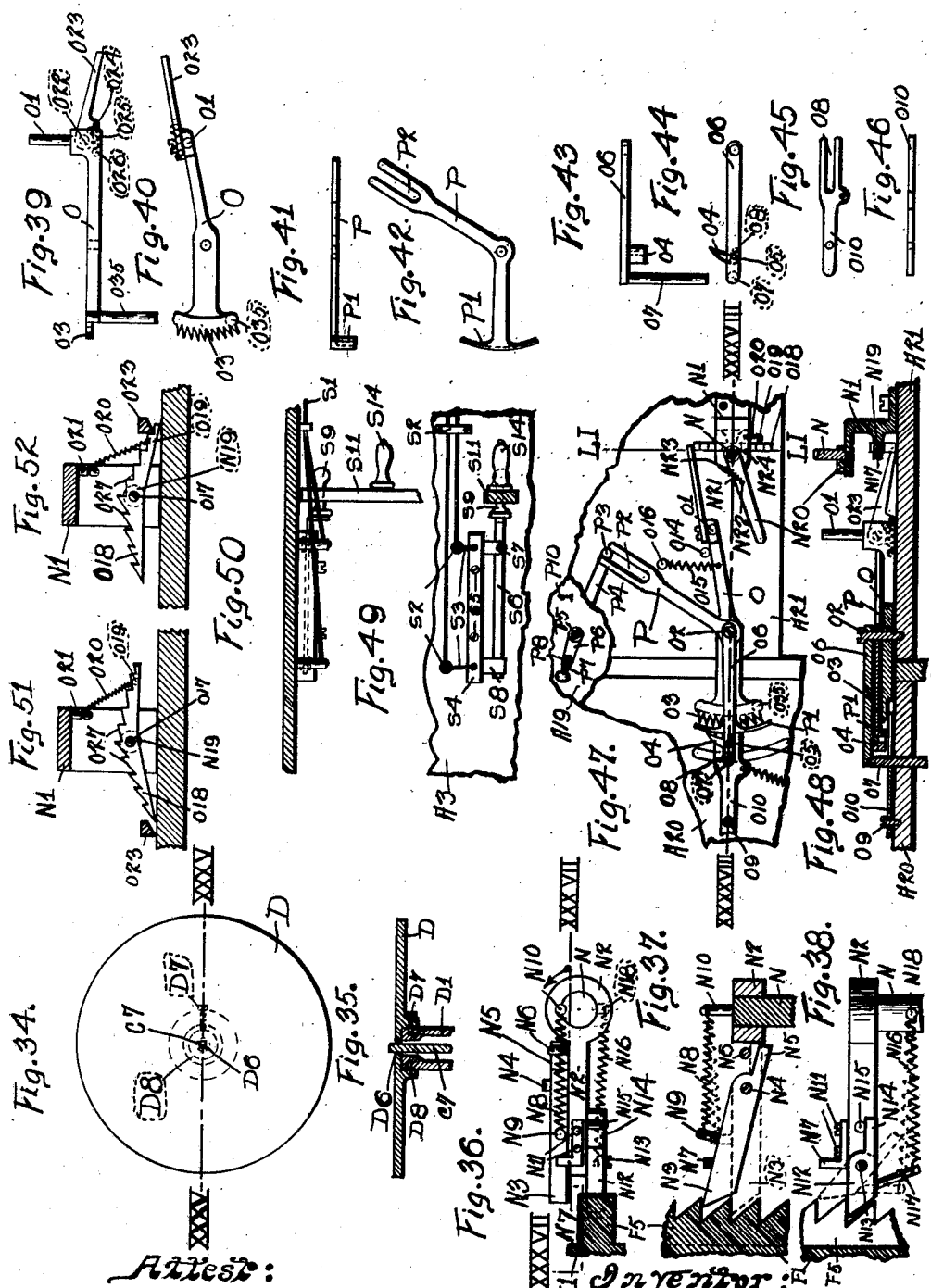

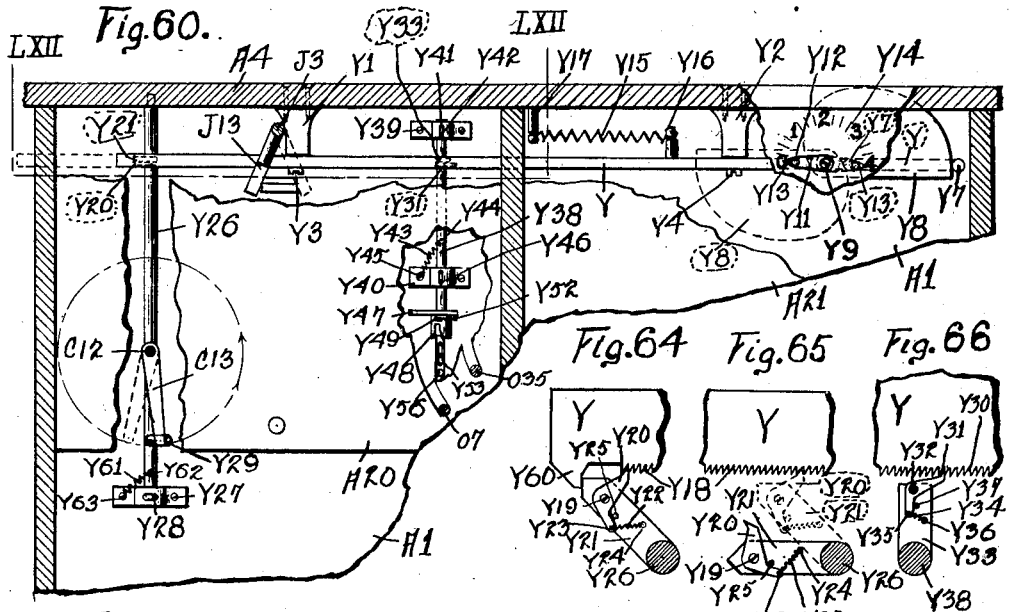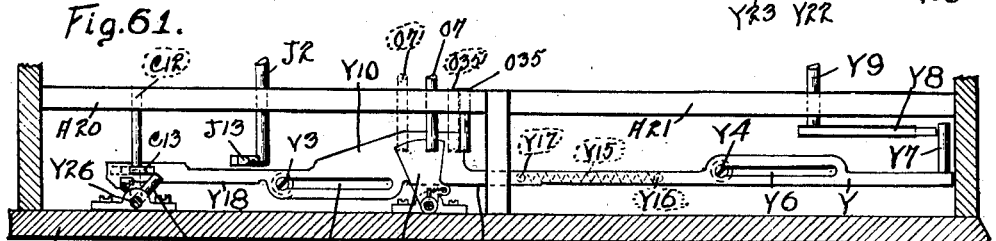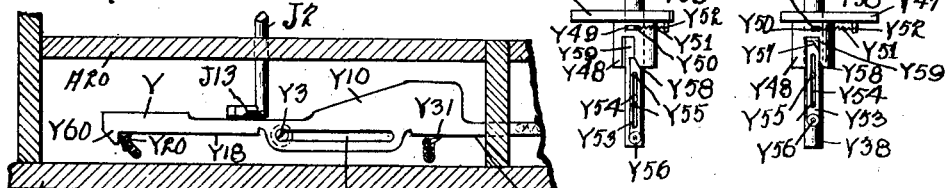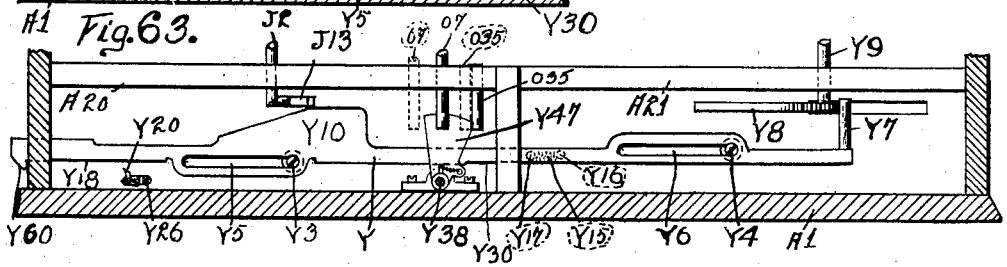

Patented July 7, 1931

1,813,472

UNITED STATES PATENT OFFICE

FERDINAND J. TILLMAN, OF ST. LOUIS, MISSOURI

AUTOMATIC PHONOGRAPH

Application filed December 22, 1919. Serial No. 346,645.

The primary object of this invention is to provide a phonograph adapted to contain a plurality of records, said phonograph containing means adapted to automatically remove each record after it has been played and adapted to automatically position another record in a position to be played.

Another object of this invention is to provide a phonograph containing means adapted to be set to automatically play a given number of records a given number of times.

Another object of this invention is to provide a phonograph containing means adapted to automatically measure the circumference of each record before playing and to automatically properly position the tone arm for playing the measured record.

Another object of this invention is to provide a phonograph containing means adapted to be set to allow a designated amount of time to elapse between the playing of each record.

Another object of this invention is to provide a phonograph containing means for automatically stopping the phonograph after a given number of records have been played.

Other and further objects will appear in this specification and will be specifically pointed out in the appended claims, reference being had to the accompanying drawings exemplifying this invention and in which;

Fig. 1 is a front view of the cabinet containing this improved automatic phonograph.

Fig. 2 is a plan view of Fig. 1.

Fig. 3 is a side view of Fig. 1.

Fig. 4 is an enlarged fragmentary view of the intermediate portion of the front of the cabinet showing this portion in open position for disclosing the interior of the cabinet and its contents.

Fig. 5 is an enlarged plan view of Fig. 4.

Fig. 6 is an enlarged fragmentary view of a portion of Fig. 5.

Fig 7 is an enlarged fragmentary view similar to Fig. 6.

Fig. 8 is an enlarged transverse section taken approximately on the line VIII—VIII of Fig. 6 having the intermediate portion thereof broken away.

Fig. 9 is an enlarged transverse section taken approximately on the line IX—IX of Fig. 7 having the intermediate portion broken away.

Fig. 10 is an enlarged longitudinal section taken approximately on the line X—X of Fig. 6, the intermediate portion being broken away.

Fig. 11 is an enlarged longitudinal section taken approximately on the line XI—XI of Fig. 7 having the intermediate portion broken away.

Fig. 12 is an enlarged fragmentary plan view of Fig. 5.

Fig. 13 is an enlarged fragmentary plan view similar to Fig. 12.

Fig. 14 is an enlarged longitudinal transverse section taken approximately on the line XIV—XIV of Fig. 4.

Fig. 15 is an enlarged vertical transverse section taken approximately on the line XV—XV of Fig. 1.

Fig. 16 is a top view of the vertically slidable rock shaft which is made cooperable with the tone arm.

Fig. 17 is a sectional view taken on the line XVII—XVII of Fig. 16.

Fig. 18 is an enlarged vertical section taken approximately on the line XVIII—XVIII of Fig. 1.

Fig. 19 is an enlarged transverse vertical section taken approximately on the line XIX—XIX of Fig. 15.

Fig. 20 is an enlarged front view of the guide plate which is made cooperable with the tone arm.

Fig. 21 is an enlarged top view of the guide plate shown in Fig. 20.

Fig. 22 is an enlarged fragmentary sectional view of a portion of Fig. 4.

Fig. 23 is an enlarged fragmentary top view of Fig. 22, a part thereof being in section.

Fig. 24 is an enlarged fragmentary side elevation of Fig. 22, a part thereof being in section.

Fig. 25 is an enlarged detailed view showing a fragmentary portion of the record receiving table post in section and showing the application of an adjustable shut-off pin thereto.

Fig. 26 is an enlarged fragmentary horizontal section taken approximately on the line XXVI—XXVI of Fig. 4.

Fig. 27 is an enlarged front elevation of Fig. 26.

Fig. 28 is an enlarged fragmentary horizontal section similar to Fig. 26 but showing some of the parts in moved positions.

Fig. 29 is an enlarged horizontal section similar to Figs. 26 and 28.

Fig. 30 is an enlarged fragmentary sectional view of a portion of Fig. 29.

Fig. 31 is an enlarged fragmentary sectional view similar to Fig. 30.

Fig. 32 is an enlarged fragmentary sectional view similar to Figs. 30 and 31.

Fig. 33 is an enlarged fragmentary sectional view similar to Figs. 30, 31 and 32.

Fig. 34 is a plan view of the turn table showing the drive shaft by which the table is revolved.

Fig. 35 is a fragmentary vertical section taken on the line XXXV—XXXV of Fig. 34.

Fig. 36 is an enlarged top view of the escapement device used in connection with the lowering of the record receiving table and the raising of the turn table.

Fig. 37 is a transverse vertical section taken on the line XXXVII—XXXVII of Fig. 6.

Fig. 38 is a side elevation partly in section of Fig. 36.

Fig. 39 is a side elevation of the intermediate tripping arm.

Fig. 40 is a top view of Fig. 39.

Fig. 41 is a side elevation of the bell-crank setting arm of the record repeating mechanism.

Fig. 42 is a top view of Fig. 41.

Fig. 43 is a side view of the pawl carrying arm which engages the ratchet of the intermediate transmitting arm.

Fig. 44 is a top view of Fig. 43.

Fig. 45 is a top view of the power engaging fork-arm.

Fig. 46 is a side view of Fig. 45.

Fig. 47 is a fragmentary view similar to Fig. 30.

Fig. 48 is a vertical sectional view taken approximately on the line XXXXVIII—XXXXVIII of Fig. 47.

Fig. 49 is a fragmentary side elevation of the shut-off switch.

Fig. 50 is a plan partly in section of Fig. 49.

Fig. 51 is an enlarged sectional view taken on the line LI—LI of Fig. 47.

Fig. 52 is a view similar to Fig. 51.

Fig. 60 is an enlarged horizontal fragmentary section taken approximately on the line LX—LX of Fig. 4.

Fig. 61 is a front view of Fig. 60.

Fig. 62 is a longitudinal sectional view taken approximately on line LXII—LXII of Fig. 60.

Fig. 63 is a longitudinal sectional view of Fig. 60.

Fig. 64 is an enlarged view of the left end of the slidable timing plate taken from Fig. 62.

Fig. 65 is an enlarged fragmentary view of the slidable timing plate taken from Fig. 63.

Fig. 66 is an enlarged fragmentary view of the slidable plate taken from Fig. 62.

Fig. 67 is an enlarged fragmentary top view of the forward end of the slidable trip rod containing the striking plate of the elapsed time mechanism held to the left by a spring taken from Fig. 61.

Fig. 68 is an enlarged fragmentary top view of the forward end of the slidable trip rod containing the striking plate of the elapsed time mechanism, taken from Fig. 63, showing the striking plate forced to the right in opposition to its spring.

Cabinet

Figure 53:
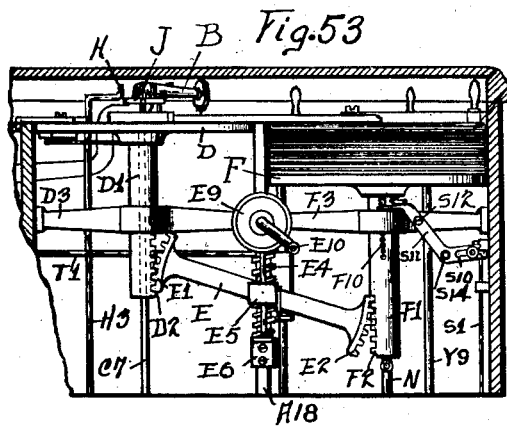
Fig. 53 is an enlarged fragmentary vertical section taken approximately on the line LIII—LIII of Fig. 3.

Referring to the drawings, A1 designates the base of the cabinet, A2 and A3 are end walls, A4 is a back wall, and A5 is a top cover, A6 is a partition wall which is secured at its lower end to the base A1 and at its upper end to the top wall A7, and at its lower end to the back wall A4 as shown in Fig. 4. The top wall is fastened to the back wall A4 and the end wall A2. The partition wall A6 and the top wall A7 form a compartment in the left hand side of the cabinet best shown in Fig. 4. A8, A9, A10 and A11 are shelves in the lower part of this compartment upon which surplus records can be placed if so desired. A12 is a cross piece forming the top part of the record compartment. A13, A14, A15, and A16 are the top, bottom and sides respectively of the amplifier A17. A partition wall A18 is fastened to the base A1 and to the back wall A4 and is braced across the top by a shelf A19, best shown in Figs. 4 and 5, and a shelf A19 is fastened to the partition wall A6 and the partition wall A18 and is extended over to and secured to the end wall A3 and the back wall A4. In the lower portion of the cabinet A best shown in Figs. 4 and 14, is a shelf A20, which is fastened to the partition wall A6, the partition wall A18 and the back wall A4, and a shelf A21 is fastened to the partition wall A18 the end wall A3 and the back wall A4, and these shelves A20 and A21 form a base for supporting a number of the parts used in connection with this automatic phonograph.

A22 is a door best shown in Fig. 1, pivotally hung from hinges A23 and A24 which are fastened to the end wall A3, and this door A22 has a knob A25.

A26 is a door pivotally hung from hinges A27 and A28, which are fastened to the partition wall A6, and this door A26 has a knob A29.

A30 is a door pivotally hung from hinges A31 and A32 which are fastened to the end wall A2, and this door A30 has a knob A33.

A34 is a door pivotally hung from hinges A35 and A36 which are fastened to the end wall A2, and this door A34 has a knob A37.

A40, A41, A42 and A43 are legs and A44 is a supporting frame fastened to all four legs for the purpose of bracing them as shown in Fig. 2. This constitutes the cabinet containing the mechanism of this automatic phonograph and will hereafter be referred to as A.

Tone arm

Inserted in the amplifier A17 at B1, best shown in Figs. 4, 5 and 14, is a connecting tube B2 and this connecting tube B2 passes on an incline through the partition wall A6 and is bent and passes vertically through the upper shelf A19, best shown in Figs. 22 and 24, and its upper end is bent and lies horizontally along the upper shelf A19. Loosely mounted over the upper end of the connecting tube B2 is an elbow B3 containing a limiting slot B7, best shown in Fig. 23, through which a pin B8 in the connecting tube B2 passes, and at the opposite end of this elbow B3 is loosely inserted a tone arm B. The elbow B3 is provided with a limiting slot B4, best shown in Fig. 24, and the tone arm B is provided with a pin B5 that is adapted to travel in the limiting slot B4. Through this limiting slot B4 and the pin B5 the tone arm B is provided with a horizontal swinging movement, and through the limiting slot B7 and the pin B8 the tone arm B is provided with a vertical swinging movement.

Loosely mounted over the forward end of the tone arm B is a reproducer B6 containing a limiting slot B9 through which a pin B10 in the tone arm B, best shown in Fig. 12, is adapted to travel, and as shown in Figs. 22 and 24 the reproducer B6 is provided with three needle holders B11 into which a soft tone, a medium tone and a loud tone needle can be inserted respectively, and it will be understood that by revolving the reproducer B6 on the tone arm B that any one of these three needles can be properly positioned to play a record.

Turn table and power mechanism

Upon the base A1 near the front right hand side of the cabinet A, best shown in Figs. 4 and 14, is a motor C and coupled to this motor C, at C1 is a worm drive shaft C2 that passes through a bearing C3 and its opposite end is journaled in a bearing C4. Between the bearings C3 and C4 and cut in the worm drive shaft C2 is a worm C5. The worm C5 meshes with a worm gear C6, best shown in Fig. 14, and the worm gear C6 is securely fastened to a square drive shaft C7 and this square drive shaft C7 is rounded on its lower end and is journaled in a bearing C8, best shown in Fig. 4, and the bearing C8 is fastened to the base A1. This square drive shaft C7 passes upward through the lower shelf A20, a small driving gear C9, a turntable supporting post D1 and a square hole D6 in the turn table D, best shown in Figs. 34 and 35, and the turn table D is adapted to be revolved through this square drive shaft C7. The turn table D is loosely mounted on the upper end of the turn table supporting post D1 best shown in Fig. 35. D7 is a key pin fastened in the turn table D and is adapted to revolve in a keyway D8 in the supporting post D1. The turn table supporting post D1, best shown in Fig. 4, passes through and is slidably keyed in a bearing D3 and the bearing D3 is fastened to and supported by the partition walls A6 and A18. It will be noted in Figs. 12 and 13 that the records X contain a square hole X1 and the records X are adapted to be placed over the square drive shaft C7 and be set on the turn table D and are adapted to be rotated with said turn table D through the square drive shaft C7.

It will be understood by referring to Fig. 4 that a number of records X can be placed on the turn table D. It has just been explained that the turn table D fits over and is adapted to turn on the upper end of the turn table supporting post D1. This turn table supporting post D1 is slidably mounted in a bearing D3 and is keyed in said bearing D3 by a key D4, best shown in Fig. 14, and is adapted to be raised or lowered within said bearing D3.

Turn table raising and record receiving table lowering mechanism

Upon the lower portion of the turn table supporting post D1 best shown in Fig. 4, is a set of teeth D2 and meshing with these teeth D2 is a set of teeth E1 which are on one end of a sector E. The sector E is pivoted at E3 to a sector supporting nut E5 and the sector supporting nut E5 is mounted over a worm E4 which will be described later. On the opposite end of the sector E are a set of teeth E2 that mesh with a set of teeth F2 of a record receiving table supporting post F1. This record receiving table supporting post F1 passes through and is slidably keyed in a bearing F3 and the bearing F3 is fastened to and supported by the partition wall A18 and the end wall A3. This record receiving table supporting post F1 is adapted to be raised or lowered in the bearing F3 and the upper end of the record receiving table supporting post F1 has securely fastened to it a record receiving table F. It will now be understood that if the turn table D was to be raised that the record receiving table F would be lowered through the sector E which is pivoted at E3 to the sector supporting nut E5.

The supporting post F1 of the record receiving table F is a solid post and the supporting post D1 of the turn table D is a hollow post, said solid supporting post F1 being sufficiently heavier than the hollow supporting post D1 so that said post F1 by reason of its greater weight will have a tendency to drop the record receiving table F downwardly and force the hollow supporting post D1 and the turn table D upwardly, but the solid supporting post F1 is prevented from dropping down more than a distance equal to the thickness of one record X at a time by an escapement device to hereafter be described. This difference of weight between the posts F1 and D1 is sufficient to overcome the friction in the mechanism between the tables F and D.

The turn table D is raised the distance of the thickness of one record X for the purpose of raising the record X that has been played above the square drive shaft C7 so that it can be removed by a record moving arm to hereafter be described.

Master gear mechanism

Near the lower end of the square drive shaft C7, best shown in Figs. 26 and 27, is a small driving gear C9 and this small driving gear C9 is in mesh with an intermediate transmission gear C10 and the intermediate transmission gear C10 is fastened to the upper end of a downward extending shaft C12 which passes downwardly through the lower shelf A20. Rigidly attached to the upper face of the intermediate transmission gear C10, is a revolving driving gear C11. These gears just described are for the purpose of reducing the speed of the revolving driving gear C11 and they continue to revolve as long as power is supplied by the motor C.

A master gear G is pivoted at G12 to the lower shelf A20 and this master gear G has a number of its teeth removed from its periphery which prevents it from coming in mesh with the teeth of the revolving driving gear C11 until it is tripped as will later be described. G1 is an arm pivoted at G2 to the lower shelf A20 and its forward end is provided with a pushing cam face G3 that engages a pin G4 on the master gear G. Fastened to the push arm G1 is a spring G5 and the opposite end of the spring G5 is fastened to a stud G6 in the back wall A4. G7 is a stop pin for limiting the distance that the spring G5 can pull the push arm G1 in that direction. The cam face G3 on the push arm G1 as just described has a tendency to push the pin G4 on the master gear G in the direction indicated by the arrow in Fig. 26 which would cause the teeth of the master gear G to mesh with the teeth of the revolving driving gear C11, but the master gear G is prevented from revolving in the direction indicated by the arrow in Fig. 26 by a pin G8 on the master gear G being caught against a holding tooth H1 of a trip pawl H2. The trip pawl H2 is fastened to the lower end of a vertical rockshaft H3 which is journaled in a bearing H4, and the bearing H4 is fastened to the back wall A4. The trip pawl H2 is held in the position shown in Fig. 26 by a spring H5 which is fastened to a stud H6 in the back wall A4, and the spring H5 tends to hold the trip pawl H2 against a stop pin H7. H8 is a stop pin used to limit the distance that the trip pawl H2 moves in the opposite direction. Rigidly fastened to the trip pawl H2 is a vertical rockshaft H3, the upper end of which passes through the top shelf A19 best shown in Fig. 22, and its upper end is provided with a trip arm H9 and the trip arm H9 contains an upward extending trip arm pin H against which the tone arm B is adapted to strike after a record X has finished playing.

If it is desired to play a record X, one of the needles in the reproducer B6 is placed on the outer edge of the record X on the turn table D, and the tones reproduced from the sound waves of the record X are carried through the tone arm B, the elbow B3, the connecting tube B2 and are expelled through the amplifier A17 as is old in the art of phonographs, but as the needle in the reproducer B6 of the tone arm B has finished following the sound grooves of the record X, it enters an automatic stop groove X2 in the record X, best shown in Figs. 12 and 13, and the needle in the reproducer B6 travels rapidly through this stop groove X2 until the tone arm B engages the trip arm pin H and as the trip arm pin H is moved to the left through the influence of the tone arm B it rocks the vertical rockshaft H3, which causes the trip pawl H2 to be moved to the left as shown in Fig. 28 until it engages the stop pin H8, and as the trip pawl H2 was moved to the left, it released the pin G8 on the master gear G and allowed the cam face G3 of the push arm G1 to push the pin G4, on the lower part of the master gear G, a great enough distance for the teeth of the master gear G to come in contact with the teeth of the revolving driving gear C11 and the revolving driving gear C11 will drive the master gear G a complete revolution until the pin G8 on the master gear G again engages the holding tooth H1 of the trip pawl H2 in which position it would be held until another record X has been played and the trip pawl H2 is again tripped by the tone arm B as just described. When the master gear G was tripped and allowed to make a complete revolution as just described, a lifting portion G9 on a cam G10 on the master gear G was allowed to engage a lifting and moving arm J1.

The lifting and moving arm J1 is securely fastened to the lower end of the vertical slidable rockshaft J2, best shown in Fig. 24, and the vertical slidable rockshaft J2 has its lower bearing in the lower shelf A20 and passes upward through a bearing J3 on the back wall A4 and is adapted to rise, lower and rock in said bearings. An upper part of the vertical slidable rockshaft J2 is bent at right angles and forms an arm J4 with an upward extending arm J5 and the upward extending arm J5 passes through a slot in the upper shelf A19 and through a record moving arm K, and its upper end is bent at right angles at J6, and fastened to the end of the arm J6 is a tone arm lifting and carrying support J. This tone arm lifting and carrying support J, best shown in Figs. 16 and 17 is a hollow segment-shaped cylinder having a limiting slot J7 cut in its upper surface. Slidably mounted in this hollow segment-shaped cylinder is a slidable lug J8, having a push pin J10 fastened into it. This push pin J10 passes upward through the limiting slot J7 of the lifting and carrying support J. A spring J9 is fastened at one end to the slidable lug J8 and its opposite end is fastened to a stud J11 in the hollow segment-shaped cylinder J and this spring J9 has a tendency to hold the push pin J10 against the end of the limiting slot J7 as shown in Figs. 16 and 17.

It will now be understood that when the needle in the reproducer B6 of the tone arm B comes in contact with the stop groove X2 of the record X after playing said record X, the tone arm B comes in contact with the trip arm pin H and causes the vertical rockshaft H3 to rock, which causes the holding tooth H1 of the trip pawl H2 to release the pin G8 which allows the master gear G to make a complete revolution as before described, and as the master gear G revolves, the lifting portion G9 on the cam G10 on the master gear G will engage the lifting and moving arm J1 of the vertical slidable rockshaft J2 and will force the lifting and moving arm J1 upwardly thereby raising the vertical slidable rockshaft J2 and the tone arm lifting and carrying support J which in turn raises the tone arm B from the record X, and as the pin G8 on the master gear G engages the lifting and moving arm J1, it will move the lifting and moving arm J1 to the position shown in Fig. 29 and the pin G8 on the master gear G thereby has rocked the vertical slidable rockshaft J2 and has moved the tone arm lifting and carrying support J and in turn the tone arm lifting and carrying support J has carried the tone arm B to a position to start a new record X, and the pin G8 on the master gear G then passes the lifting and moving arm J1 and the declining portion G11 on the cam G10 on the master gear G will allow the lifting and moving arm J1 to gradually be lowered thereby allowing the needle in the reproducer B6 of the tone arm B to come in contact with the outer edge of the record X next to be played.

To make positive that the tone arm B is lifted perpendicularly, carried horizontally and lowered perpendicularly on the record X, a guide plate J12 is provided. The guide plate J12 is best shown in Figs. 19, 20, 21, 22 and 24. The lower portion of the vertical slidable rockshaft J2 is bent at right angles and forms a square guide end J13 which is adapted to be lifted perpendicularly along the left face or edge of the guide plate J12 and is adapted to be moved to the right along the top face or edge of the guide plate J12, and is adapted to be lowered perpendicularly along the left face or edge of the guide plate J12 and is adapted to be moved to the left along the lower face or edge of the guide plate J12. Pawls J14 and J15, best shown in Fig. 20, are provided for the purpose of preventing reverse movement of the square guide end J13 of the vertical slidable rockshaft J2. The pawl J14 is pivoted at J16 and the pawl J15 is pivoted at J17 to the rectangular guide plate J12, and the ends of the pawls J14 and J15 are fastened together by a spring J18 which tends to hold the pawls J14 and J15 against their respective stop pins J19 and J20. This rectangular guide plate J12 is provided for the purpose of making a positive segmentary rectangular movement of the tone arm lifting and carrying support J so as to lift the tone arm B vertically, carry it horizontally and lower it vertically on the other edge of the record X next to be played.

When the vertical slidable rockshaft J2 is about to be lowered to allow the tone arm B to again engage a record X it is assisted through the influence of a spring J21, best shown in Fig. 24, which is fastened at one end to a stud J22 on the arm J4 of the vertical slidable rockshaft J2 and at the opposite end to a stud J23 in the bearing J3, and the lifting and moving arm J1 is returned to its normal position against a stop pin J25 by a spring J24, best shown in Fig. 26, which is fastened at one end to the lifting and moving arm J1 and at the opposite end to a stud H6 in the back wall A4, in which position the lifting and moving arm J1 and the vertical slidable rockshaft J2 (as shown in Fig. 26) will remain until again operated by the master gear G or until the tone arm B has finished playing a record X as before described.

Record moving mechanism

The record moving arm K shown in Figs. 5, 6 and 7 is pivoted at K1 to the upper shelf A19 best shown in Figs. 6 and 7 and contains a slot K2 through which the upward extending arm J5 of the vertical slidable rockshaft J2 passes, as shown in Fig. 24. It will now be understood that as the vertical slidable rockshaft J2 is rocked to reposition the tone arm B as before described, the upward extending arm J5 that passes through the slot K2 in the record moving arm K will carry the record moving arm K with it, and if the turntable D has raised a record X above the square drive shaft C7 as will be later described, the record moving arm K will engage the record X that has been raised and will move it from the turn table D to the record receiving table F.

It has now been described how a record X that has been played is removed from the turn table D to the record receiving table F, and the tone arm B is repositioned on the next record X to be played.

Guide track

It will be noted in Figs. 8, 9, 10 and 11 that the record X has beveled edges, X3 and as the record moving arm K moved the record X from the turn table D to the record receiving table F, is just described, the beveled edge X3 of the record X engaged the inclined face L1 on a track L and the record X that was moved from one table to another, therefore was forced on top of the track L and traveled along this track L when being moved from the turn table D to the record receiving table F by the record moving arm K, and passed down the inclined face L2 of the track L to the record receiving table F.

Record measuring mechanism

Referring to Figs. 5, 12 and 13. Pivoted at M1 to the upper shelf A19, best shown in Fig. 12 is a record measuring arm M containing on its forward end a downward extending record measuring pin M2 and on the opposite end of the record measuring arm M is a sector M3 and the sector M3 is constantly in mesh with a gear M4. The gear M4 is securely fastened to the upper end of a shaft M5 which passes downwardly through the upper shelf A19 as shown in Fig. 22, and securely fastened to the lower end of the shaft M5 is a cam M6 and abutting this cam M6 is an arm M7 and the arm M7 is pivoted at M8 to the underneath side of the upper shelf A19 and attached to a stud M9 near the center of the arm M7 is a pull rod M10 and the opposite end of the pull rod M10 is fastened to a stud M11 on an arm M12. The arm M12 is securely fastened to the lower end of a rockshaft M13 and near the top the rockshaft M13 is bent at right angles and forms an arm M14 and the front end of the arm M14 is bent upward at right angles and forms an upward extending stop pin M15.

The record measuring arm M normally rests behind the record moving arm K, as shown in Fig. 5 and on the rearward end of the record measuring arm M is a light spring M16 that fastens over a stud M17 on the record measuring arm M and the opposite end of the light spring M16 is fastened to a stud M18 in the upper shelf A19.

When the record moving arm K is moved through the vertical slidable rockshaft J2 as before described, it releases the record measuring arm M and the light spring M16 of the record measuring arm M forces the forward end of the record measuring arm M to the right as shown in Fig. 13 until its record measuring pin M2 engages the next record X to be played, and as the forward end of the record measuring arm M is moved to the right, the sector M3 on the rearward end of the record measuring arm M moves to the left causing the gear M4 and the cam M6 to rotate to the left and the cam M6 causes the arm M7 to move to the left and through the pull rod M10 the arm M12 is pulled to the left thereby rocking the rockshaft M13 to carry the stop pin M15 to the left thereby positioning the stop pin M15 in a position to stop the tone arm B in the proper position to play the record X that has been measured through the record measuring pin M2 on the record measuring arm M.

The smaller the record X, the greater distance to the right the record measuring pin M2 is allowed to travel before it engages said record X and the further to the right the record measuring pin M2 is allowed to travel before engaging the record X, the further to the left the stop pin M15 is positioned.

It will therefore be understood that any size record X that the record measuring pin M2 measures, the stop pin M15 will correspondingly be positioned to stop the tone arm B according to the size of the record X that has been measured through the measuring pin M2 on the record measuring arm M.

As before described, the tone arm support J best shown in Figs. 16 and 17 contains an upward extending pin J10 which is held against the right of the limiting slot J7 by a spring J9 as shown in Fig. 17 and when the tone arm B is stopped by the stop pin M15, this spring J9 will allow the push pin J10 to move to the left through the limiting slot J7, a distance great enough to offset the distance that the stop pin M15 travels to the left. It will be understood that the tone arm support J always travels the distance of the largest record that the turn table D will accommodate and therefore the push pin J10 is provided with the spring J9 so that it can yield when the stop pin M15 is automatically set for a smaller sized record.

It will be understood that when the record moving arm K is returned to its normal position as shown in Fig. 5, that it will engage the record measuring arm M and force it back to the position shown in Fig. 5, in which position the record measuring arm M normally rests back of and against the the record moving arm K, it being understood that the light spring M16 on the record measuring arm M is lighter than the spring which returns the record moving arm K. This spring is J24 and is fastened to the lifting and moving arm J1 which is located on the lower end of the vertical slidable rockshaft J2 as shown in Fig. 26, therefore the record moving arm K holds the record measuring arm M in the aforesaid position.

Table tripping mechanism

Referring to Fig. 18. Cut in the key F4 of the solid supporting post F1 of the record receiving table F is a set of ratchet escapement teeth F5 and meshing with these ratchet escapement teeth F5 is a rockable escapement device adapted to intermittently lower the record receiving table F a distance equal to the thickness of one record X as will now be described. Journaled in a bearing N1 on the lower shelf A21, is a vertical escapement rockshaft N, the upper end of which passes through an extension of the bearing F3 and this vertical escapement rockshaft N, is adapted to rock in the bearings just described.

Securely fastened on the upper end of this vertical escapement rockshaft N, is a rockable escapement device containing a supporting arm N2 best shown in Figs. 36, 37 and 38. A loose escapement tooth N3 is pivoted at N4 to the supporting arm N2 and this loose escapement tooth N3 contains an extension N5 adapted to abut against a stop pin N6 on the supporting arm N2, as shown in dotted lines in Fig. 37, but this loose escapement tooth N3 is normally held in a raised position against a stopping abutment N7, as shown in full lines in Fig. 37, by a spring N8, which is fastened at one end to a stud N9 on the loose escapement tooth N3 and at the opposite end to a stud N10 on the supporting arm N2, on the upper end of the vertical escapement rockshaft N. The stopping abutment N7 is fastened to the supporting arm N2 by screws N11.

When the loose escapement tooth N3 is rocked in mesh with the ratchet escapement teeth F5 of the solid supporting post F1 by the vertical escapement rockshaft N, the weight of the solid supporting post F1 will force the loose escapement tooth N3 downwardly to the position shown in dotted lines in Fig. 37 with the extension N5 of the loose escapement tooth N3 in contact with the stop pin N6 on the supporting arm N2, thereby allowing the record receiving table F to be lowered one tooth or a distance equal to the thickness of one record X and as before described through the sector E, the turn table D will be raised a distance equal to the thickness of one record X which allows the record X that has been played, on the turn table D, to be raised above the square drive shaft C7 in a position to be engaged by the record moving arm K. The record X on the turn table D is thereby moved by the record moving arm K from the turn table D to the record receiving table F by mechanism before described.

When the vertical escapement rock shaft N is allowed to rock back and the loose escapement tooth N3 is rocked back out of mesh with the teeth F5 of the solid supporting post F1, the solid supporting post F1 is prevented from lowering by a loose retaining tooth N12 which is pivoted at N13 on the opposite side of the supporting arm N2 as shown in Fig. 36. This loose retaining tooth N12 is held in a normal downward position, as shown in full lines in Fig. 38, by a spring N16 which is fastened at one end to a stud N17 on the loose retaining tooth N12 and the opposite end is fastened on a stud N18 on the vertical escapement rockshaft N. This spring N16 has a tendency to hold the extension N14 of the loose retaining tooth N12 against the stop pin N15 on the supporting arm N2. This loose retaining tooth N12 is provided to yield to the position shown in dotted lines in Fig. 38 when the record receiving table F is forced upward manually by mechanism to hereafter be described.

The loose retaining tooth N12 is provided for the purpose of preventing the solid supporting post F1 from lowering while the loose escapement tooth N3 is out of mesh with the teeth F5. It will therefore be understood that when a record X has been played and is to be moved from the turn table D to the record receiving table F, the vertical escapement rockshaft N is rocked in the direction indicated by the arrow in Fig. 36 by mechanism to be described later, and the loose escapement tooth N3 enters the teeth F5 one tooth higher than the loose retaining tooth N12 and allows the record receiving table F to be lowered one tooth or a distance equal to the thickness of one record X which allows the turn table D through the sector E, to be raised a distance equal to the thickness of one record X thereby allowing the record X on the turn table D to be raised to a position to be engaged and moved by the record moving arm K.

The loose retaining tooth N12 is provided to yield to the position shown in dotted lines in Fig. 38 when it is again desired to raise the record receiving table F and through the sector E, lower the turn table D for the purpose of again placing records X on the turn table D.

It is now understood that when the vertical escapement rock shaft N is rocked by mechanism to be described later in the direction indicated by the arrow shown in Fig. 36, it will allow the loose retaining tooth N12 to pass out of mesh with the teeth F5 of the solid supporting post F1 and the loose escapement tooth N3 will enter the teeth F5 of the solid supporting post F1 one tooth higher. The weight of the record receiving table F and its solid supporting post F1 will force the loose escapement tooth N3 downwardly until the extension N5 of the loose escapement tooth N3 comes in contact with the stop pin N6 as shown in dotted lines in Fig. 37. Therefore the solid supporting post F1 will be lowered one of its teeth F5 which is equal to the thickness of one record X, and each time a record X on the turn table D has been played and is to be removed from the turn table D to the record receiving table F, the vertical escapement rockshaft N is rocked by mechanism to be described later, and will allow the record receiving table F to be dropped downwardly the distance of one tooth of the ratchet teeth F5 which is equal to the thickness of one record X, and through the sector E the turn table D will be raised a distance of the thickness of one record X and the record that has been played is raised above the square drive shaft in a position to be engaged and moved from the turn table D to the record receiving table F by the record moving arm K as before described.

As the rockshaft N is rocked in the opposite direction by mechanism to be described later, the loose escapement tooth N3 will be released from the teeth F5 and the loose retaining tooth N12 will prevent the teeth F5 from lowering until the loose escapement tooth N3 is again rocked back in mesh with the teeth F5 as just described.

Securely fastened to the lower end of the vertical escapement rock shaft N, best shown in Fig. 47, is a table tripping arm N20 which is adapted to be struck by a tripping pin O1 on an intermediate transmitting arm O, as will now be described. A spring N21 is fastened at one end to a stud N22 on the table tripping arm N20 and its opposite end is fastened to a stud N23 in the bearing N1. This spring N21 has a tendency to hold the table tripping arm N20 in its normal position against a stud N23 as shown in Fig. 47. N24 is a limiting stud fastened in the bearing N1 and is used for the purpose of limiting the distance that the table tripping arm N20 travels in that direction.

A tripping pin O1 is fastened near one end of the intermediate transmitting arm O and the intermediate transmitting arm O is pivoted at O2 to the lower shelf A21 and the opposite end of the intermediate transmitting arm O is provided with ratchet teeth O3. A pawl O4 is adapted to engage the ratchet teeth O3 and this pawl O4 is pivoted at O5 to a pawl carrying arm O6 and the pawl carrying arm O6 is also pivoted at O2 to the lower shelf A21. The forward end of the pawl carrying arm O6 is provided with a pin O7 and this pin O7 passes downward through a fork O8 in one end of a power engaging fork arm O10 and the power engaging fork arm O10 is pivoted at O9 to the lower shelf A20 and the opposite end of the power engaging fork arm O10 is adapted to be struck by the pin G4 on the master gear G, best shown in Fig. 28.

Fig. 26 shows the pawl O4 of the pawl carrying arm O6 in its normal position adapted to engage the last tooth of the teeth O3 of the intermediate transmitting arm O, and Fig. 28 shows the pawl O4 of the pawl carrying arm O6 in its operated position with the tripping pin O1 engaging the table tripping arm N20 thereby rocking the vertical escapement rockshaft N.

It will now be understood that when a record X has completed playing and the master gear G is tripped by the tone arm B as before described, the master gear G starts a complete revolution and as it does so, the pin G4 on the lower part of the master gear G engages the power engaging fork arm O10 and carries it to the position shown in Fig. 28, and in doing so, the fork O8 of the power engaging fork arm O10 carried the pin O7 on the pawl carrying arm O6 to the position shown in Fig. 28, and the pawl O4 on the pawl carrying arm O6 engaged the last tooth of the ratchet teeth O3 on the intermediate transmitting arm O and forced it to the position shown in Fig. 28, and the tripping pin O1 on the opposite end of the intermediate transmitting arm O engaged the table tripping arm N20 thereby rocking the vertical escapement rockshaft N and allowing the rockable escapement device to lower the record receiving table F, and through the sector E, raise the turntable D a distance equal to the thickness of one record X in which case the record X on the turn table D will be raised above the square drive shaft C7 in a position to be engaged and removed by the record moving arm K as before described.

When the pin G4 on the master gear G released the power engaging fork arm O10 by passing beyond it as shown in Fig. 29, a spring O11 which is fastened at one end to the power engaging fork arm O10 and at the other end to a stud O12 in the lower shelf A20 returns and holds the power engaging fork arm O10 against a stop pin O13 as shown in Fig. 29 in which position it is again ready to be engaged by the pin G4 on the master gear G when the master gear G is again tripped by the tone arm B as before described, and the pawl O4 on the pawl carrying arm O6 is returned to the position shown in Fig. 29 through the fork O8 and the pin O7, and the intermediate transmitting arm O is returned to its normal position against the stop pin O14 as shown in Fig. 29, by a spring O15 which is fastened at one end to the intermediate transmitting arm O and at the other end to a stud O16 in the lower shelf A21.

Record repeating mechanism

P is a bell-crank setting arm best shown in Figs. 41, 42, 47 and 48. This bell crank setting arm P is pivoted at O2 to the lower shelf A21. On one end of this bell crank setting arm P is an interference plate P1 adapted to be positioned between the ratchet teeth O3 of the intermediate transmitting arm O and the pawl O4 of the pawl carrying arm O6, for the purpose of preventing the pawl O4 from engaging the ratchet teeth O3 of the intermediate transmitting arm O. On the opposite end of this bell crank setting arm P is a fork P2 and this fork P2 straddles a pin P3. The pin P3 is fastened to an arm P4 and this arm P4 is securely fastened near the lower end of a rockshaft P5, best shown in Fig. 18. This rockshaft P5 is journaled in the lower shelf A21 and passes upward through the upper shelf A19 and an arm P6 is securely fastened to its upper end. This arm P6 shown in Figs. 26, 28 and 29 contains a pointer P7 and a handle P8. The pointer P7 is adapted to indicate along a graduated scale P10 on the upper shelf A19.

It will now be explained that when the pointer P7 is pointing to the numeral 1 on the graduated scale P10, the interference plate P1 is in the position shown in Fig. 26 and it does not prevent the pawl O4 of the pawl carrying arm O6 from engaging the last tooth of the ratchet teeth O3 of the intermediate transmitting arm O. In this case the pawl O4 engages the last tooth of the ratchet teeth O3 of the intermediate transmitting arm O and is adapted to move the intermediate transmitting arm O its full distance of ten teeth O3 to the position shown in Fig. 28. As the intermediate transmitting arm O is moved its full distance of ten teeth as shown in Fig. 28, the tripping pin O1 on the opposite end of the intermediate transmitting arm O will engage the table tripping arm N20 and cause the record receiving table F to be lowered the distance of one record X through the rockable escapement device as before described.

It will now be understood that when a record X has completed playing and the master gear G is tripped by the tone arm B as before described, the master gear G starts a complete revolution and as it does so the pin G4 on the lower part of the master gear G engages the power engaging fork arm O10 and carries it to the position shown in Fig. 28. In doing so the fork O8 of the power engaging fork arm O10 carries the pin O7 of the pawl carrying arm O6 to the position shown in Fig. 28, and the pawl O4 on the pawl carrying arm O6 engages the last tooth of the ratchet teeth O3 of the intermediate transmitting arm O and forces the intermediate transmitting arm O to the position shown in Fig. 28 and the tripping pin O1 on the opposite end of the intermediate transmitting arm O engages the table tripping arm N20 thereby rocking the vertical escapement rockshaft N and allowing the rockable escapement device to lower the record receiving table F, and through the sector E, raise the turn table D a distance equal to the thickness of one record X, in which case the record X on the turn table D will be raised in a position to be engaged and removed by the record-moving arm K as before described, and therefore each record X will be changed after playing one time.

If it is desired to play a record X twice, the handle P8 is moved until the pointer P7 points to the numeral 2 on the graduated scale P10 as shown in Figs. 30 and 31 and as the handle P8 was moved to the position opposite the numeral 2 on the graduated scale P10 as just described, the pin P3 on the arm P4 was moved to the position shown in Figs. 30 and 31. The pin P3 therefore carried with it the fork P2 and the interference plate P1 to the position shown in Fig. 30. It will be noted in Fig. 30 that the interference plate P1 has covered up five of the teeth O3 of the intermediate transmitting arm O and therefore leaves only five teeth O3 to be operated on by the pawl O4. It will therefore be understood that when a record X has been played and the master gear G is tripped by the tone arm B as before described, the pin G4 on the master gear G engaged and moved the power engaging fork arm O10, and moves the pawl carrying arm O6 and the pawl O4, a distance equal to the ten teeth O3 of the intermediate transmitting arm O, but as the interference plate P1 covered up half of the teeth O3 of the intermediate transmitting arm O, the pawl O4 rode idly a distance equal to five of the teeth O3 and then engaged the fifth tooth of the teeth O3 of the intermediate transmitting arm O on this operation of the master gear G. In this case the tripping pin O1 on the opposite end of the intermediate transmitting arm O is not carried far enough to engage the table tripping arm N20, therefore the tables were not tripped and the record X remained on the turn table D and was played the second time. But when the tone arm B again trips the master gear G after the record X has been played the second time, the power engaging fork arm O10 again carries the pawl O4 a distance equal to ten teeth O3 of the intermediate transmitting arm O, in which case the pawl O4 rides idly the distance of five teeth O3 and then engages the last tooth of the ratchet teeth O3 of the intermediate transmitting arm O and moves the ratchet teeth O3 of the intermediate transmitting arm O a distance of five teeth O3. Therefore it requires two operations of the pawl O4 by the master gear G before the intermediate transmitting arm O is moved the distance of ten teeth O3 or far enough for its tripping pin O1 to engage the table tripping arm N20 so as to rock the vertical escapement rockshaft N and allow the rockable escapement device to lower the record receiving table F and raise the turn table D a distance equal to the thickness of one record X so that the record X on the turn table D is raised to a position to be engaged and removed by the record moving arm K as before described.

If it is desired to repeat a record X three times, the handle P8 is moved until the pointer P7 points to the numeral 3 on the graduated scale P10 and the interference plate P1 in this case covers up all but four of the ratchet teeth O3 of the intermediate transmitting arm O and it will therefore require three operations of the pawl O4 by the master gear G before the intermediate transmitting arm O is moved its full distance of ten teeth O3 as the pawl O4 would carry the intermediate transmitting arm O only four teeth O3 on its first operation by the master gear G, four teeth O3 on the second operation by the master gear G and the remaining two teeth on the third operation of the master gear G, thus requiring three operations of the pawl O4 by the master gear G to move the intermediate transmitting arm O a great enough distance for its tripping pin O1 to engage the table tripping arm N20 of the vertical escapement rockshaft N, therefore a record X has remained on the turn table D and has been played three times before the turn table D was allowed to be raised and the record X on the turn table D was allowed to be engaged and removed by the record moving arm K as before described.

If it is desired to play a record X four times the handle P8 is moved until the pointer P7 points to the numeral 4 on the graduated scale P10, and in this case the interference plate P1 has covered up all but three of the teeth O3 of the intermediate transmitting arm O and the pawl O4 will require four operations by the master gear G before it carries the intermediate transmitting arm O a great enough distance for its tripping pin O1 to engage the table tripping arm N20, as the pawl O4 would carry the intermediate transmitting arm O only three teeth O3 on its first operation, three teeth O3 on its second operation, three teeth O3 on its third operation and the remaining one tooth O3 on its fourth operation, thus requiring four operations of the pawl O4 by the master gear G to move the intermediate transmitting arm O its full distance of ten teeth O3 or a great enough distance for its tripping pin O1 to come in contact with and trip the table tripping arm N20, therefore, the record X has remained on the turn table D and has been played four times before the turn table D is finally raised and the record X on the turn table D is allowed to be engaged and removed by the record moving arm K.

If it is not desired to play a record X five times, the handle P8 is moved until the pointer P7 points to the numeral 5 on the graduated scale P10, as shown in Fig. 32, and in this case the interference plate P1 has covered up all but two of the ratchet teeth O3 of the intermediate transmitting arm O and it will therefore require five operations of the pawl O4 by the master gear G to move the intermediate transmitting arm O its full distance of ten teeth O3 and therefore the record X is allowed to remain on the turn table D and is played five times before the turn table D is raised and the record X on the turn table D is raised to a position to be engaged and removed by the record moving arm K.

If it is desired to repeat the record X ten times, the handle P8 is moved until the pointer P7 points to the numeral 10 on the graduated scale P10. In this position all but one tooth of the ratchet teeth O3 of the intermediate transmitting arm O are covered up by the interference plate P1 and it will require ten operations of the master gear G before the pawl O4 will finally move the intermediate transmitting arm O its full distance of ten teeth or before the pin O1 on the intermediate transmitting arm O engages the table tripping arm N20. Therefore the record X on the turn table D will be played ten times before finally being raised and allowed to be engaged and removed by the record moving arm K.

If it is desired to play a record X indefinitely, the handle P8 is moved until the pointer P7 points to the numeral 0 on the graduated scale P10 as shown in Fig. 47 and in this case the interference plate plate P1 covers up all of the teeth O3 of the intermediate transmitting arm O and the intermediate transmitting arm O is completely out of the influence of the pawl O4 and the pawl O4 will be prevented from engaging any of the teeth O3 of the intermediate transmitting arm O by the interference plate P1, and the record X on the turn table D would not be removed by the record moving arm K because the turn table D would not be raised and therefore the record X on the turn table D would be replayed as long as power was supplied through the power mechanism C.

*Ratchet preventing retard movement of sector*

Upon the bearing N1 best shown in Figs. 48, 51 and 52 is a lug N19 and pivoted at O17 to this lug N19 is a ratchet O18 containing a stud O19 and fastened to this stud O19 is a light spring O20 and the opposite end of this light spring O20 is fastened to a stud O21 in the bearing N1. This light spring O20 has a tendency to hold one end of the ratchet O18 in an upward position as shown in Fig. 51. Pivoted at O22 to the intermediate transmitting arm O is a retarding arm O23, as shown in Figs. 26, 27, 39 and 40, and the lower portion of the retarding arm O23 is provided with a stud O24 over which a heavy spring O25 is fastened, and the opposite end of the heavy spring O25 is fastened to a stud O26 in the intermediate transmitting arm O. The heavy spring O25 tends to hold the retarding arm O23 downward, and as the intermediate transmitting arm O is moved by the pawl O4, the arm O23 which is pivoted to the intermediate arm O will ride over approximately one half the number of the teeth O27 on the ratchet O18 as shown in Fig. 51 before engaging the teeth of the ratchet O18 and the retarding arm O23 will consequently be held from being returned. After the intermediate arm O has been moved the distance of more than five of its ratchet teeth O3, and the retarding arm O23 has passed the pivot O17 of the ratchet O18, the retarding arm O23 through the influence of its heavy spring O25 will then force the ratchet O18 into the position shown in Fig. 52, in which position the retarding arm O23 is still held from returning by the teeth O27 of the ratchet O18. After the retarding arm O23 has passed the tenth and last tooth O27 of the ratchet O18, the light spring O20 will swing the ratchet O18 to the position shown in Fig. 51 and the arm O23 will be allowed to return under the ratchet O18 to the position shown in Fig. 51. Therefore it is obvious that the ratchet O18 prevents return movement of the intermediate transmitting arm O by the retarding arm O23 until the intermediate transmitting arm O has been moved its full distance of ten teeth O3 by the pawl O4 for the purpose of engaging the table tripping arm N20 as before described.

*Returning a record from the record receiving table to the turn table*

Referring to Fig. 5. Located to the right and pivoted on the upper shelf A19 at R1 is a record returning arm R containing a handle R2 and this record returning arm R is adapted to engage the record X that has automatically been moved from the turn table D to the record receiving table F as before described.

If it is desired to return the record X that has been played from the record receiving table F back to the turn table D, the handle R2 is moved manually to the left and the record returning arm R engages the record X and moves it from the record receiving table F back to the turn table D.

*Lowering the turn table to accommodate records to be played*

Figure 58:
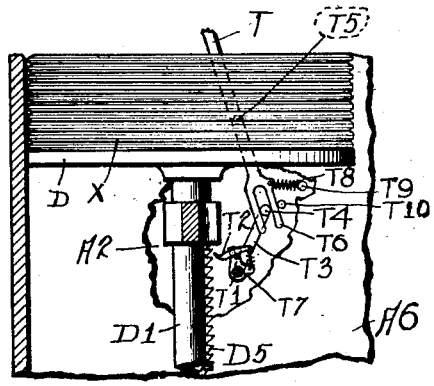
Fig. 58 is an enlarged fragmentary view showing the lowered position of the turn table.
Figure 59:
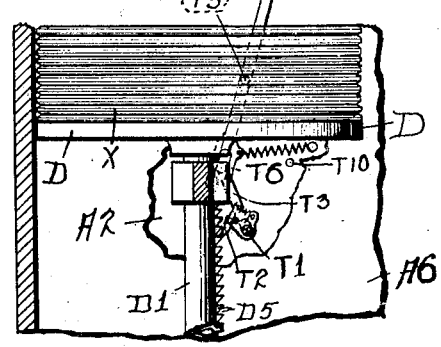
Fig. 59 is an enlarged view similar to Fig. 58.

Referring to Figs. 4, 5, 14, 15, 57 and 58. Rockably mounted in the end wall A2 best shown in Figs. 5 and 14, is a rockable rod T1 and this rockable rod T1 passes to the right under the amplifier A17, through the partition wall A6 and its opposite end is rockably mounted in the partition wall A18. Securely fastened to the rockable rod T1 between the partition walls A6 and A18 and opposite the key D4 is an arm T7 carrying a pawl T2. This pawl T2 best shown in Figs. 15, 58 and 59, is adapted to mesh with the teeth D5 of the key D4 of the supporting post D1. Securely fastened on the left hand side of the rockable rod T1 is an arm T3 and the upper end of this arm T3 contains a pin T4. Pivoted above this arm T3 is a turn table lowering arm T and this turn table lowering arm T is pivoted at T5 to the end wall A2 and the lower end of the turn table lowering arm T contains a fork T6 adapted to fit over the pin T4 on the arm T3. When it is desired to lower the turn table D, the turn table lowering handle T is pushed rearwardly thereby causing its fork T6 to be moved forwardly, which fork T6 in turn carries the pin T4 and the arm T3 forwardly, thereby causing the rockable rod T1 to rock the pawl T2 in a forward and downward direction, and as the pawl T2 engages one of the teeth D5 of the turn table supporting post D1 it forces the turn table supporting post D1 downwardly the distance of two teeth D5 as shown in Fig. 59.

As the turn table D was lowered the depth of two teeth as just described, the record receiving table F was raised through the sector E the distance of two teeth and the loose retaining tooth N12 was forced to the position shown in dotted lines in Fig. 38 and as the ratchet teeth F5 was raised the distance of two teeth D5 the loose retaining tooth N12 was forced out of the tooth that it engaged and the loose retaining tooth N12 was pulled downwardly through the influence of its spring N16 until it engages the next lowest tooth in order on the ratchet teeth F5, and as the turn table lowering handle T is released the ratchet teeth F5 are allowed to lower through the weight of the solid supporting post F1 and thereby forces the loose retaining tooth N12 downwardly the distance of one tooth until the extension N14 on the loose retaining tooth N12 engages the stop pin N15 on the supporting arm N2, as shown in Fig. 38.

It will now be understood that when the turn table lowering handle T is operated, the turn table D is lowered and the record receiving table F is raised the distance of two teeth but when the turn table lowering handle T is released, the record receiving table F drops down one tooth and it leaves the record receiving table F one tooth higher, which is equal to the thickness of one record X, therefore it can be seen that each time the turn table lowering handle T is operated the record receiving table F is raised and the turn table D is lowered the distance equal to the thickness of one record X. (Therefore the turn table is lowered to accommodate another record to be played.)

When the turn table lowering handle T was released as just described a spring T8 (as shown in Fig. 58) which is fastened at one end to the turn table lowering handle T and at the other end to a stud T9 in the end wall A2 returns and holds the turn table lowering handle T against a stop pin T10 as shown in Fig. 58.

*Changing a record manually before it has completed playing*

The operator may move the trip arm pin H to the left thereby causing the tone arm support J to lift the tone arm B off the record X and the tone arm support J will slide idly under the tone arm B until the push pin J10 of the tone arm support J engages the tone arm B at the position the tone arm B was lifted off the record X, and the push pin J10 will then push the tone arm B to a position to be lowered on the next record X to be played.

If the record repeating mechanism was set at 1 when the operator moved the trip arm pin H as just described, the record X would be removed and the next record X in order on the turn table D would be played, but if the record repeating mechanism was set at more than one and the record X on the turn table D was not removed, the operator may move the escapement rod handle N30, best shown in Fig. 18, which will operate the rockable escapement device on the upper end of the vertical escapement rockshaft N which allows the receiving table to be lowered and the turn table D to be raised the distance equal to the thickness of one record X so that the record X on the turn table D can be removed by the record moving arm K, as before described.

It will therefore be understood that if the machine is set for repeating, that is set to play a record more than once and a record X has started to play, and the operator desires to have the record X removed and the tone arm B positioned on the next record X in order on the turn table D, the operator may operate the escapement rod handle N30 which trips the tables D and F, and then the operator moves the trip arm pin H to the left which causes the master gear G to reposition the tone arm on the next record X to be played.

*Setting the tables to accommodate a given number of records*

Figure 54:
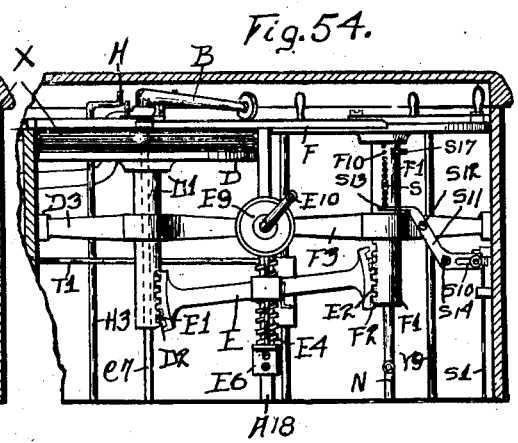
Fig. 54 is a view similar to Fig. 53.
Figures 55, 56, 57:
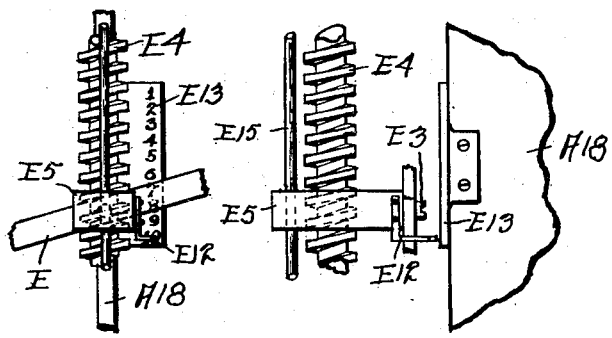
Fig. 55 is an enlarged fragmentary detailed view of the lowering and raising worm shaft having the sector supporting nut.
Fig. 56 is an enlarged side elevation of Fig. 55.
Fig. 57 is an enlarged fragmentary view similar to Fig. 55.

The automatic phonograph as shown in Fig. 4 is set for playing ten records and after these ten records have been played and they have been moved to the record receiving table F by the record moving arm K, as shown in Fig. 53, they can easily be removed by the operator. If it is desired to set the tables D and F to accommodate a lesser number of records X, the sector E through the sector supporting nut E5 is raised on the worm E4 as will now be described. As before explained the sector E that raises and lowers the tables D and F is pivoted at E3 to a sector supporting nut E5 best shown in Fig. 18, and this sector supporting nut E5 is mounted on a worm E4 and the worm E4 is journaled in a lower bearing E6 which is fastened to the partition wall A18 and the upper end of the worm E4 passes through a U-shaped bearing E7 which is fastened to the partition wall A18. Fastened to the upper end of the worm E4 is a bevel gear E8 that is in mesh with another bevel gear E9 and the bevel gear E9 is fastened on a crank handle E10 which passes through the U-shaped bearing E7 and the bevel gear E9 is held against the U-shaped bearing E7 by a pin E11 which passes through the crank handle E10. Fastened to the sector supporting nut E5 is an indicating hand E12 as shown in Figs. 55, 56 and 57, that is adapted to indicate along a graduated scale E13. The graduated scale E13 is fastened to the partition wall A18 and indicates the number of records X that the tables D and F are set to accommodate. If it is desired to set the tables D and F to accommodate a given number of records X, the operator turns the crank handle E10 which revolves the bevel gears E9 and E8 and these gears in turn revolve the worm E4 and cause the sector supporting nut E5 to be raised or lowered on the worm E4 according to the direction the crank handle E10 is turned. As the sector supporting nut E5 is raised or lowered on the worm E4, it will raise or lower the sector E which is pivoted to it at E3 and will thereby raise or lower the tables D and F, and the indicating hand E12 will indicate at all times the number of records X that the tables D and F are set to accommodate, that is, if the crank handle E10 is turned until the indicating hand E12 points to the numeral 4 on the graduated scale E13 as shown in Fig. 57, the tables D and F would have room to accommodate only four records X, as shown in Fig. 54. It will therefore be understood that the sector E can be raised or lowered on the worm E4 as just described, thereby setting the tables D and F to accommodate the number of records X as indicated by the indicating hand E12 and the graduated scale E13.

E15 is a guide rod journaled at one end in the lower bearing E6, best shown in Fig. 18, and passing loosely upward through the sector supporting nut E5 and its upper end is fastened in the U-shaped bearing E7. This guide rod E15 is for the purpose of preventing the sector supporting nut E5 from turning on the worm E4 and also tends to hold the sector teeth E1 and E2 in mesh with the teeth D2 and F2 of their respective supporting posts D and F.

*Stopping the motor automatically after a given number of records have been played*

Referring to Figs. 4 and 14. Connected to the motor C are wires S1 which are held in place along the base A1 by cleats S2 and these wires S1 are strung along the base A1 and up the inside of the end wall A3 and are held in place by cleats S2, and the opposite ends of the wires S1 as shown in Fig. 49 are connected at S3 to a single blade knife switch S4. This single blade knife switch S4 is fastened to the end wall A3 by screws S5 and a knife blade S6 on the single blade knife switch S4 is pivoted at S7 to the single blade knife switch S4 and the opposite end of the knife blade S6 is adapted to engage a contact plate S8. The forward end of the knife blade S6 is provided with an insulated handle S9 which is straddled by a fork S10 in a shutoff arm S11, best shown in Figs. 49, 50, 53 and 54. The shut off arm S11 is pivoted at S12 to a lug F6 on the bearing F3 as shown in Fig. 14, and the upper end of the shut off arm S11 as shown in Fig. 4 is provided with a striking end S13.

The solid supporting post F1 of the record receiving table F is provided with a number of holes F10 best shown in Fig. 25, and these holes F10 are spaced apart a distance equal to the thickness of one record X. S is an adjustable shutoff pin containing a handle S15 and two pins S16 adapted to be inserted into two of the holes F10 of the solid supporting post F1. If it is desired to automatically stop the phonograph after playing a given number of records X the pins S16 of the adjustable shutoff pin S are inserted into two of the holes F10 of the solid supporting post F1 that is, if it is desired to play say four records X before automatically stopping the phonograph the pins S16 of the stop pin S are inserted in the fourth and fifth holes F10 above the striking end S13 of the shutoff arm S11 and as the record receiving table F is lowered the fourth time, the adjustable shutoff pin S engages the striking end S13 of the shutoff arm S11 and forces the shutoff arm S11 in a downward direction and the fork S10 of the shutoff arm S11 is forced in an upward direction, thereby causing the insulated handle S9 and the knife blade S6 to be forced in an upward direction. And the opposite end of the knife blade S6 is forced downwardly away from the contact plate S8 which breaks the circuit and causes the motor C to stop. As the adjustable shutoff pin S can be inserted in any two of the holes F10 of the solid supporting post F1, it will be understood that the machine can be set to play any set number of records X before automatically breaking the circuit and stopping the motor C.

If it is desired to start or stop the motor C manually, it can be accomplished by raising or lowering a shift handle S14 on the arm S11 as shown in Figs. 4, 49 and 50, thereby forcing the knife blade S6 in or out of contact with the contact plate S8 according to the direction the shift handle S14 is operated.

If the adjustable shutoff pin S was not inserted in any of the holes F10 as just described, the solid supporting post S1 is provided with a pin S17 which is securely fastened near the upper end of the solid supporting post F1 best shown in Fig. 4 and this pin S17 is adapted to engage the striking end S13 of the shut off arm S11, so when the tables D and F are set in their normal positions to accommodate ten records X, this shutoff pin S17 is permanently set in the post F1 for the purpose of breaking the circuit and stopping the motor C and the power mechanism after the tenth and last record X on the turntable D has been played.

*Record cleaning mechanism*

Fastened to the bottom of the record moving arm K best shown in Fig. 22, is a record cleaning material K3 and as the record moving arm K is moving a record X from the turn table D to the record receiving table F as before described, the record cleaning material K3 is moved across the top of the record X next to be played, and if a record X is being repeated, the record cleaning material K3 on the record moving arm K is moved across the record X. Therefore each time a record X is either played or repeated, it is cleaned by the record cleaning material K3 on the record moving arm K before being played.

*Elapsed time mechanism*

Below the lower shelves A20 and A21 best shown in Fig. 60 are two lugs Y1 and Y2 which are fastened to the back wall A4 and slidably mounted on screws Y3 and Y4, on the front of these lugs Y1 and Y2 is a slidable timing plate Y and this slidable timing plate Y is provided with slots Y5 and Y6 best shown in Figs. 61 and 63 and this slidable timing plate Y is adapted to be moved to the right or left over the screws Y3 and Y4. Near the center of the slidable timing plate Y is a holding cam Y10 which is adapted to be moved under the square guide end J13 of the vertical escapement rockshaft J2. This holding cam Y10 is for the purpose of holding the vertical slidable rockshaft J2 in a raised position as shown in Fig. 63 and thereby preventing the tone arm B from being placed on a record X until a certain amount of time has elapsed between the playing of each record X as will now be described.

On the right hand side of this slidable timing plate Y is an upward extending pin Y7 which is adapted to be engaged and set by a time setting cam Y8 and this time setting cam Y8 is securely fastened on the lower end of a rockable bar Y9 best shown in Fig. 4 and the upper end of this rockable bar Y9 is provided with a minute setting arm Y11 best shown in Fig. 60 provided with an upward extending setting handle Y12 and an indicating pointer Y13. The indicating pointer Y13 is adapted to co-operate with a minute scale Y14 graduated to indicate the minutes or fractions thereof of elapsed time between the playing of each record X. Y15 is a spring fastened at one end to a stud Y16 on the slidable timing plate Y and at the other end to a stud Y17 in the back wall A4, and this spring Y15 has a tendency to pull the slidable timing plate Y to the left as shown in Fig. 63, until the pin Y7 engages the time setting cam Y8 in the position the time setting cam Y8 is set through the minute scale Y14.

Near the left hand side of the slidable timing plate Y and cut in the lower edge of the slidable timing plate Y, is a set of ratchet teeth Y18 best shown in Figs. 61, 62, 63, 64 and 65. Located below and cooperating with these ratchet teeth Y18 is an intermittent returning pawl Y20 which is pivoted at Y19 to a pawl arm Y21, best shown in Figs. 64 and 65. A spring Y22 is fastened at one end to a stud Y23 on the intermittent returning pawl Y20 and at the other end to a stud Y24 on the pawl arm Y21. This spring Y22 has a tendency to hold the intermittent returning pawl Y20 against a stop pin Y25 on the pawl arm Y21. The pawl arm Y21 is securely fastened to an intermittent rockable rod Y26 and one end of this intermittent rockable rod Y26, best shown in Fig. 60, is journaled in the back wall A4 and the forward end of this intermittent rockable rod Y26 is journaled in a bearing Y27 which is securely fastened to the lower base A1. Near the forward end of the intermittent rockable rod Y26 is an upward extending power engaging pin Y29 which is adapted to be struck by a revolving arm C13 which is securely fastened to the lower end of a power shaft C12 and the power shaft C12 passes upward through the lower shelf A20, best shown in Figs. 26 and 27, and is securely fastened to the power gears C10 and C11 and is adapted to turn therewith.

It will now be understood that as the power gears C10 and C11 constantly revolve, that the power shaft C12 also constantly revolves and therefore the revolving arm C13 also constantly revolves and on each revolution of the power gears C10 and C11 the revolving arm C13 will engage the upward extending power engaging pin Y29 and will force it to the position shown in Fig. 61, thereby rocking the intermittent rockable rod Y26, and as this intermittent rockable rod Y26 is rocked, it carries with it the pawl arm Y21 (which is securely fastened to it) and the intermittent returning pawl Y20 is forced from the position shown in full lines in Fig. 65 to the position shown in dotted lines in Fig. 65. In this position the intermittent returning pawl Y20 has engaged one of the teeth Y18 of the slidable timing plate Y and has forced the slidable timing plate Y to the right a distance of one tooth Y18. It will be understood that the greater distance to the left that the slidable timing plate Y is allowed to travel (before the pin Y7 engages the time setting cam Y8) the longer time it will take before the intermittent returning pawl Y20 will return the slidable timing plate Y to its normal position to the right.

It will also be understood that as the revolving arm C13 makes twenty revolutions per minute, it thereby engages the power engaging pin Y29 twenty times a minute and as the intermittent returning pawl Y20 returns the slidable timing plate Y only one tooth Y18 on each operation, it will take one minute's time for it to return the slidable timing plate Y a distance of twenty teeth Y18, and it will be understood that if the setting hand Y13 is pointing to the numeral 1 on the minute scale Y14 that the time setting cam Y8 will be set in a position to stop the pin Y7 of the slidable timing plate Y after the slidable timing plate Y has traveled to the left twenty teeth Y18 and it will therefore take one minute's time for the slidable timing plate Y to be returned to its normal position to the right through the intermittent returning pawl Y20, and the holding cam Y10 on the slidable timing plate Y will therefore hold the vertical slidable rockshaft J2 in a raised position or on the incline face of its holding cam Y10 until one minute's time has elapsed, and through the vertical slidable rockshaft J2, the tone arm B will be held off the record X for one minute's time. This being the method for providing elapsed time between the playing of records X.

It will be understood that if the setting hand Y13 is pointing to the numeral 2 on the minute scale Y14, as shown in Fig. 26, the slidable timing plate Y would be allowed to travel to the left the distance of forty teeth Y18 before its pin Y7 engages the time setting cam Y8, as shown in Fig. 26. It will therefore require the intermittent returning pawl Y20 two minutes to return the slidable timing plate Y forty teeth Y18 or to its normal position to the right. The holding cam Y10 of the slidable timing plate Y will therefore hold the vertical slidable rock shaft J2, and the tone arm B, off the record X for a period of two minutes.

If it is desired to have four minutes' time elapse between the playing of records X, the pointer Y13 is placed opposite the numeral 4 on the minute scale Y14, as shown in dotted lines in Fig. 60, and the pin Y7 on the slidable timing plate Y will allow the slidable timing plate Y to travel to the left the distance of eighty teeth Y18 before the pin Y7 engages the time setting cam Y8, as shown in dotted lines in Fig. 60, and it will therefore be understood that as the intermittent returning pawl Y20 returns the slidable timing plate Y only twenty teeth Y18 a minute that it will require four minutes' time to return the slidable timing plate Y the distance of eighty teeth Y18 and therefore the holding cam Y10 will hold the tone arm B off the record X, through the vertical slidable rockshaft J2 until four minutes' time has elapsed, and the vertical slidable rockshaft J2 is allowed to be lowered and the tone arm B is again lowered on a record X.

It will now be understood that when the slidable timing plate Y is released by mechanism to be described later, that the spring Y15 will pull the slidable timing plate Y to the left until the pin Y7 on the slidable timing plate Y engages the time setting cam Y8 in the position the time setting cam Y8 is set through the minute scale Y14 and that the intermittent returning pawl Y20 will intermittently return the slidable timing plate Y to its normal position to the right.

Near the forward end of the intermittent rockable rod Y26 is a spring Y61 which is fastened at one end to a stud Y62 on the intermittent rockable rod Y26 and at the opposite end to a stud Y63 in the bearing Y27 and this spring Y61 has a tendency to hold the intermittent rockable rod Y26 to the right with its pin Y28 against the left end of the limiting slot in the bearing Y27, in which position the power engaging pin Y29 is in a raised position and in the path of the revolving arm C13 and each time the power engaging pin Y29 is struck and forced downwardly by the revolving arm C13, as shown in Fig. 61, and the revolving arm C13 passes beyond the power engaging pin Y29, the spring Y61 will again rock the intermittent rockable rod Y26 to the left and the power engaging pin Y29 will again be raised to an elevated position. It will also be understood that when the power engaging pin Y29 is in an elevated position that the intermittent returning pawl Y20 is in a lowered position, and when the power engaging pin Y29 is forced downwardly, by the revolving arm C13, as shown in Fig. 61, the intermittent returning pawl Y20 will be forced in a raised position as shown in dotted lines in Fig. 65.

On the extreme left hand side of the slidable timing plate Y is a holding abutment Y60, best shown in Figs. 62-64 and this holding abutment Y60 is adapted to engage the upper end of the pawl arm Y21 and hold the pawl arm Y21 in a raised position and it will be understood that when the slidable timing plate Y is returned to its normal position to the right, the pawl arm Y21 will be held in an upward position and out of operation by the holding abutment Y60 until the slidable timing plate Y is released by mechanism now to be described.

Near the center of the slidable timing plate Y and cut in the lower edge of said slidable timing plate Y is a set of retarding ratchet teeth Y30, best shown in Figs. 62 and 66, and located below and co-operating with the retarding ratchet teeth Y30, is a trippable retarding pawl Y31. This trippable retarding pawl Y31 is pivoted at Y32 to a pawl arm Y33, best shown in Fig. 66. Y34 is a spring fastened at one end to a stud Y35 on the trippable retarding pawl Y31 and at the other end to a stud Y36 on the pawl arm Y33, and this spring Y34 has a tendency to hold the trippable retarding pawl Y31 against a stop pin Y37 on the pawl arm Y33 and in mesh with the retarding ratchet teeth Y30 of the slidable timing plate Y.

The pawl arm Y33 is securely fastened to a slidable trip rod Y38, best shown in Fig. 60 and this slidable trip rod Y38 is slidably mounted in bearings Y39 and Y40 and the bearing Y39 is provided with a limiting slot Y41 through which a limiting pin Y42 is adapted to slide, the limiting pin Y42 being securely fastened in the slidable trip rod Y38. Y43 is a spring fastened at one end to a stud Y44 on the slidable trip rod Y38 and at the opposite end to a stud Y45 on the bearing Y40. This spring Y43 has a tendency to hold the slidable trip rod Y38 in a forward position with its limiting pin Y46 against the forward end of a limiting slot in the bearing Y40. Near the forward end of this slidable trip rod Y38 is a striking plate Y47 and this striking plate Y47 is provided with a collar Y48, as shown in Figs. 60, 67 and 68, and the collar Y48 is provided with a slot Y49 through which a limiting pin Y50 passes and the limiting pin Y50 is securely fastened to the slidable trip rod Y38. Y51 is a spring fastened at one end to the limiting pin Y50 and at the opposite end to a stud Y52 on the striking plate Y47. This spring Y51 has a tendency to hold the striking plate Y47 against the limiting pin Y50 as shown in Fig. 67. Y53 is a slidable holding arm provided with a slot Y54. Y55 are pins that pass through the slot Y54 and are securely fastened in the slidable trip rod Y38. Y56 is a handle fastened to the forward end of the slidable holding plate Y53.

If the handle Y56 is pulled in a forward position as shown in Fig. 67, the spring Y51 will be allowed to hold the striking plate Y47 to the left as shown in Figs. 61 and 67 in which position the striking plate Y47 is adapted to be struck by the pin O7 on the pawl carrying arm O6, as shown in Fig. 61, and when the handle Y56 is moved rearwardly as shown in Fig. 68, the cam face Y57 on the slidable holding plate Y53 will engage a cam face Y58 on the collar Y48 and the slidable holding plate Y53 will be allowed to enter the slot Y59 in the collar Y48, and as the slidable holding plate Y53 enters the slot Y59, it will force the striking plate Y47 to the right as shown in Figs. 63 and 68 and in a position to be struck by a pin O35 on the intermediate transmitting arm O of the record repeating mechanism.

If it is desired to have elapsed time between the playing of each record X the handle Y56 is pulled to a forward position as shown in Fig. 67 this will allow the striking plate Y47 to be held to the left as shown in Figs. 61 and 67, in this position the striking plate Y47 is adapted to be struck by the pin O7 on the pawl carrying arm O6. It will therefore be understood that after each record X has been played one time and the pawl carrying arm O6 is operated through the master gear G, as before described, the striking plate Y47 will be struck by the pin O7 on the pawl carrying arm O6, and the striking plate Y47 will be forced rearwardly and the retarding pawl Y31 on the pawl arm Y33 will be forced rearwardly, and the retarding pawl Y31 will move rearwardly and this will release the teeth Y30 of the slidable timing plate Y and will thereby allow the slidable timing plate Y to be pulled to the left by its spring Y15 until the pin Y7 of the slidable timing plate Y engages the time setting cam Y8 in the position the time setting cam Y8 is set through the minute scale Y14. When the striking plate Y47 is released from the influence of the pin O7 on the pawl carrying arm O6, the slidable trip rod Y38 will again be allowed to be pulled in a forward direction through the spring Y43, and the retarding pawl Y31 will again engage the retarding ratchet teeth Y30 of the slidable timing plate Y and will hold the slidable timing plate Y from retard movement while it is being returned by the intermittent returning pawl Y20 as before described.

If the machine is set for repeating, but it is not desired to have the elapsed time take place, when a record is being repeated, but it is desired to have the elapsed time take place before the playing of the next record, the handle Y56 on the slidable trip rod Y38 is pushed rearwardly, as shown in Fig. 68 and the striking plate Y47 would be forced to the right in a position to be struck by the pin O35 on the intermediate transmitting arm O of the record repeating mechanism, and in this case the striking plate Y47 will be engaged only when the next record X is to be played and the striking plate Y47 will not be struck by the pin O35 on the intermediate transmitting arm O when a record X is to be repeated.

It will therefore be understood that when the striking plate Y47 is positioned to the right, as shown in Fig. 63, it is in a position to be engaged by the pin O35 on the intermediate transmitting arm O and the elapsed time will not take place between the repeating of each record but will only be in operation upon the playing of a new record and it will also be understood that if it is desired to have elapsed time on records that are being repeated that the striking plate Y47 can be moved to the left, as shown in Fig. 61 in a position to be struck by the pin O7 of the pawl carrying arm O6 in which case there will be elapsed time between each record being played or repeated.

*Preventing operation of the automatic mechanism*

Pivoted at Z1 near the front of the lower shelf A20, best shown in Figs. 26, 27, 28 and 29, is a locking arm Z, provided on its rearward end with a locking pin Z2. If it is desired to disconnect the automatic mechanism so as to play the phonograph manually, the forward end of the locking arm Z is moved to the right and its upward extending locking pin Z2 will engage one of the teeth of the master gear G and will force the master gear G slightly in a reverse direction and will then enter one of the teeth of the master gear G, and while the pin Z2 is in engagement with one of the teeth of the master gear G, it prevents the master gear G from revolving, and therefore when the tone arm B engages the trip arm pin H, the holding tooth H1 of the trip pawl H2 will move idly to the left, and the needle in the reproducer B6 in the tone arm B will engage the circle X4 on the record X and will ride idly in it until the phonograph is stopped manually. In this case all the automatic mechanism of the phonograph will be locked from operation by the arm Z as just described and the playing of the automatic phonograph will have to be done manually.

What I claim is:

1. A phonograph having a magazine adapted to contain a number of records of small or large diameters, a power mechanism, means for playing the records in a set order, a tone arm operable on the records for playing them, means operated through the power mechanism to place each record in a position to be played, means operated through the power mechanism to remove each record from playing position after it has been played and to control the distance of travel of said tone arm relative to it engaging a small or large diameter record, and a series of guide-ways each being for the reception of respective records.

2. A phonograph operated by power mechanism adapted to contain a number of records of different sizes to be played in a set order, said phonograph comprising a turn table to simultaneously revolve the records thereon, a tone arm bearing a playing needle to reproduce the sound waves of the records, a record measuring mechanism cooperable with said tone arm for measuring each record before playing for determining the position of engagement of the needle of the tone arm with the next record to be played, means operated by the power mechanism to remove each record after being played, and a respective guideway for receiving each different size record.

3. A phonograph provided with a turn table for supporting a series of records which are placed one on top of another, a tone arm bearing a playing needle for cooperation with each record, means for discharging each record after being played, means operable with the next record to be played for locating the position of engagement of the playing needle thereto, and means for elevating and lowering said tone arm relative to each record played.

4. A phonograph provided with a turn table for supporting records, a tone arm bearing a playing needle for cooperation with the records, and a vertical slidable member cooperable with said tone arm for lowering and raising it, means for rocking said member, and guiding means cooperable with said member during the sliding and the rocking thereof.

5. A phonograph comprising power mechanism having means whereby a number of records can be placed one above the other in the order in which they are to be played, a playing structure and a receiving structure, mechanical means for moving each record after being played from the playing structure to the receiving structure, means for changing the intervening time between the playing of each of the records, and an adjustable shutoff mechanism adapted to be set to shut off the power mechanism before all of the records have been played.

6. A phonograph operated by power mechanism adapted to contain a plurality of records to be played in a set order, a repeating mechanism adapted to be set to play each record one or more times, means for setting the repeating mechanism to play each record one or more times, means for changing the intervening length of time between the playing of the repeating record, and an adjustable shut off mechanism adapted to be positioned to shut off the power mechanism before all of the records have been played.

7. A phonograph operated by power mechanism comprising a turn table adapted to receive a plurality of records to be played in a set order, a receiving table adapted to receive the records that have been played, means provided whereby the turn table is raised the distance of one record, and the receiving table is lowered the distance of one record, after a record has been played, a moving arm adapted to be operated by the power mechanism for engagement with the outer edge of the record and move the record that has been played from the turn table to the record receiving table, and guiding means located between said turn table and said receiving table for engagement with opposing edges of each record as each record is being moved to said receiving table.

8. A phonograph operated by power mechanism comprising a turn table adapted to receive a plurality of records to be played in a set order, a receiving table adapted to receive the records that have been played, an escapement device adapted to be operated by the power mechanism after a record has been played for raising the turn table the distance of one record, and lowering the receiving table the distance of one record, a swingable arm operated by the power mechanism for engaging the outer edge of the record for moving the record that has been played from the turn table to the record receiving table, and guiding means comprising paralleling upturned portions located between said turn table and said receiving table for guiding the records to said receiving table.

9. A phonograph operated by power mechanism comprising a turn table adapted to contain a plurality of records, said records adapted to revolve with said turn table, a receiving table adapted to receive the records that have been played, an escapement mechanism adapted to allow the receiving table to be lowered the distance of one record, and means to simultaneously raise the turn table the distance of one record, and means provided for moving a record after being played to said receiving table, and simultaneously wipe the playing surface of the next record to be played.

10. A phonograph operated by power mechanism having a magazine adapted to contain a plurality of records, means for playing the records, a record changing mechanism, a record repeating mechanism cooperable with the record changing mechanism, the record repeating mechanism adapted to be set to repeat each record a given number of times before the record changing mechanism is operated, and means for changing the length of time between the playing of each record.

11. A phonograph having a turn table adapted to contain a number of records, a receiving table adapted to receive records that have been played, a lever adapted to raise one table and simultaneously lower the other table, a mechanism adapted to be operated manually for raising or lowering the fulcrum of said lever thereby raising or lowering the tables to accommodate a desired number of records.

12. In a phonograph, a power mechanism, a turn table for supporting a number of records to be played, a receiving table for receiving each record after being played, a raising and lowering mechanism for simultaneously raising one table and lowering the other table, a shut-off mechanism cooperable with said power mechanism and said raising and lowering mechanism, and adjustable means for cooperation with said shut-off mechanism to automatically shut off said power mechanism.

13. A phonograph provided with a power mechanism, a turn table for receiving records of different diameters, a receiving table for the records, a tone arm for operating on the records of the turn table, means cooperable with the power mechanism to remove each record from the turn table to said receiving table, and guiding means located between said tables for engaging diametrically opposing edges of the records.

14. In a phonograph, a power mechanism, a turn table adapted to receive records of different diameters, a series of guideways each adapted to a different diametered record, a tone arm operable with the records, means operated by said power mechanism to control the distance of travel of said tone arm relative to it being positioned for cooperably engaging either a small or large diametered record, and means cooperable with said power mechanism for discharging each played record on its respective guideway.

15. In a phonograph, a power mechanism, a turn table being adapted to receive records of different diameters, a tone arm operable with the records, means operated by said power mechanism to control the distance of travel of said tone arm relative to it being positioned for cooperably engaging either a small or large diametered record, means cooperable with said power mechanism for discharging each played record, and a guideway provided with means for engagement with diametrically opposing edges of the different sized records for facilitating their discharge.

16. A phonograph provided with a vertically movable table whereby it can support a number of records to be played in a set order, and other means to be set manually to cause the record supporting means to be set to accommodate a greater or a lesser number of records to be played.

17. A phonograph provided with a turn table and a receiving table, said turn table adapted to support a number of records which are mounted one upon another in the order which they are to be played, and manually operated means provided whereby said receiving table will be located in a horizontal receiving plane with the uppermost record borne by said turn table, whether a greater or lesser number of records is supported on said turn table.

18. A phonograph provided with a turn table which is adapted to support a number of records, a receiving table adapted to singly receive the records that have been played, a lever having a sector at one end to raise one table and means at the other end to lower the other table, and a mechanism for raising or lowering the pivot of said lever for providing adjustment to said turn table relative to the number of records to be borne thereby.

19. A phonograph provided with a turn table and a receiving table means for actuating said tables, simultaneously upwardly and downwardly, and other means provided for moving one of said tables without moving the other table.

20. A phonograph provided with a turn table for supporting a series of different sized records which are placed one on top of another, a tone arm bearing a playing needle for cooperation with each record, means for discharging each record after being played, and means operable with the next record to be played for locating the position of engagement of the playing needle thereto.

21. A phonograph provided with a turn table adapted to contain a series of records to be played, means for moving records singly from said table after being played, and means for wiping the playing surface of the next record to be played, comprising a wiping element actuated by said record moving means.

22. A phonograph provided with a turn table adapted to contain a series of records to be played, means for moving records singly from said table after being played, and means for wiping the playing surface of the next record to be played, comprising a wiping element carried by said record moving means.

23. A phonograph provided with a pair of record holding tables, each being adapted to contain a plurality of records, a power mechanism for rotating one of said tables, means cooperable with said mechanism for discharging the records singly from one table to the other, and means actuated by said discharging means for wiping the playing surface of the next record in the order of discharge.

24. A phonograph provided with a power mechanism, a turn table adapted to contain a number of records cooperable with said mechanism, means to be automatically lowered for receiving each record after being played, a shut off mechanism adapted to shut off said power mechanism, and an adjustable shut off member adapted to be predeterminingly set for shutting off said power mechanism after a number of records have been played.

25. A phonograph provided with means whereby a number of records can be arranged in the order in which they are to be played, a power mechanism, mechanical means for removing each record after it has been played, means for changing the intervening time between the playing of each of the records, and other means cooperable with said power mechanism adapted to be predeterminingly set for shutting off said power mechanism before all the records have been played.

26. In a phonograph, the combination of a power mechanism, a turn table for receiving records which are to be played, a tone arm cooperable with each record after said record is engaged on said table, means cooperable with said mechanism for discharging the records from said table, receiving means to be automatically lowered for receiving each discharged record, predetermining means for changing the intervening time between the playing of each of the records, and a shutting-off mechanism cooperable with said power mechanism and said predetermining means.

27. A phonograph comprising a turn table for supporting a number of records, a power mechanism for operating said table, an automatically movable table for receiving the records after being played, means for engaging and moving each record to the receiving table after each record has been played and an adjustable shut-off mechanism adapted to shut-off the power mechanism after a given number of records have been played.

28. A phonograph having a turn table for receiving a number of records to be played, a power mechanism cooperable with said table, a receiving table, means for engaging each record after being played and moving it to said receiving table, a shut-off mechanism cooperable with said power mechanism and adjustable means cooperable with said shut-off mechanism for stopping said power mechanism.

29. A phonograph having a turn table for receiving records to be played, a power mechanism cooperable with said table, a receiving table, means for engaging each record after being played and moving it to said receiving table, a shut-off mechanism cooperable with said power mechanism, adjustable means cooperable with said shut-off mechanism for stopping said power mechanism and means for simultaneously lowering one of the said tables and raising the other said table.

30. A phonograph having a turn table for receiving a number of records to be played, a power mechanism cooperable with said table, means for playing the records, a record repeating mechanism cooperable with said power mechanism, and predetermining means cooperable with said repeating mechanism adapted to be set to repeat the record being played a predetermined number of times.

31. A phonograph having a turn table for receiving a number of records to be played, a power mechanism cooperable with said table, means for playing the records, a record changing mechanism cooperable with the power mechanism, a record repeating mechanism cooperable with the record changing mechanism and predetermining means cooperable with the repeating mechanism adapted to be set to repeat each record a predetermined number of times.

32. A phonograph having a turn table for receiving a number of records to be played, a power mechanism cooperable with said table, means for playing the records, a record repeating mechanism cooperable with said power mechanism, and predetermining means comprising a setting element adapted to be set to repeat each record a desired number of times.

33. A phonograph having a turn table for receiving a number of records to be played, a power mechanism cooperable with said table, means for playing the records, a record repeating mechanism cooperable with said power mechanism, and an indicating mechanism adapted to be set to indicate the number of times each record is to repeat.

34. A phonograph having a turn table for receiving records of different diameters, a power mechanism cooperable with said table, means for playing the records, a record repeating mechanism cooperable with said power mechanism, means for moving each record from the table after being played and predetermining means adapted to be set for actuation after the playing of each record for changing the time interval between the playing of each record.

35. A phonograph having a turn table for receiving records to be played, a power mechanism cooperable with said table, means for playing the records, a record repeating mechanism cooperable with said power mechanism, means for moving each record from the table after being played and an indicating mechanism adapted to be set for actuation after the playing of each record to predetermine the length of time between the playing of each record.

36. A phonograph having a turn table for receiving records to be played, a power mechanism cooperable with said table, means for playing the records, a record repeating mechanism cooperable with said power mechanism, means for moving each record from the table after being played and an indicating mechanism adapted to be set for actuation after the playing of each record to indicate the interval of time between the playing of each record.

FERDINAND J. TILLMAN.